US012306553B2

(12) United States Patent
Saito et al.

(10) Patent No.: US 12,306,553 B2
(45) Date of Patent: May 20, 2025

(54) IMAGE FORMING APPARATUS AND UNIT FOR IMAGE FORMING APPARATUS

(71) Applicant: FUJIFILM Business Innovation Corp., Tokyo (JP)

(72) Inventors: Yohei Saito, Ebina (JP); Jiro Korenaga, Ebina (JP); Ryota Kaneko, Ebina (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/451,602

(22) Filed: Aug. 17, 2023

(65) Prior Publication Data

US 2024/0302764 A1 Sep. 12, 2024

(30) Foreign Application Priority Data

Mar. 7, 2023 (JP) ................................ 2023-034956

(51) Int. Cl.

| | |
|---|---|
| ***G03G 5/147*** | (2006.01) |
| ***G03G 15/01*** | (2006.01) |
| ***G03G 15/02*** | (2006.01) |

(52) U.S. Cl.

CPC ..... *G03G 15/0216* (2013.01); *G03G 5/14704* (2013.01); *G03G 15/0194* (2013.01); *G03G 2215/2048* (2013.01)

(58) Field of Classification Search

CPC .. G03G 5/14704; G03G 15/75; G03G 5/0507; G03G 5/047

See application file for complete search history.

(56) References Cited

U.S. PATENT DOCUMENTS

| | | | | |
|---|---|---|---|---|
| 9,581,919 | B1 * | 2/2017 | Mera | G03G 5/0507 |
| 2019/0302632 | A1 * | 10/2019 | Torigoe | G03G 5/147 |
| 2019/0346781 | A1 * | 11/2019 | Katsuhara | G03G 5/047 |
| 2020/0117105 | A1 * | 4/2020 | Watanabe | G03G 5/142 |

FOREIGN PATENT DOCUMENTS

| | | |
|---|---|---|
| JP | 2019-197188 A | 11/2019 |
| JP | 2020-8688 A | 1/2020 |

* cited by examiner

*Primary Examiner* — Jessica L Eley

(74) *Attorney, Agent, or Firm* — Sughrue Mion, PLLC

(57) ABSTRACT

An image forming apparatus includes an electrophotographic photoreceptor that includes a conductive substrate, a photosensitive layer, and an inorganic surface layer containing a group 13 element and oxygen in this order, a charging device that charges a surface of the electrophotographic photoreceptor, an electrostatic charge image forming device that forms an electrostatic charge image on the charged surface of the electrophotographic photoreceptor, a developing device that accommodates an electrostatic charge image developer containing a toner and a carrier with a volume resistance value of $1\times10^{9}\Omega$ or greater and $1\times10^{16}\Omega$ or less, supplies the electrostatic charge image developer, and develops the electrostatic charge image formed on the surface of the electrophotographic photoreceptor as a toner image, and a transfer device that transfers the toner image formed on the surface of the electrophotographic photoreceptor to a surface of a recording medium.

9 Claims, 4 Drawing Sheets

IMAGE FORMING APPARATUS AND UNIT FOR IMAGE FORMING APPARATUS

CROSS-REFERENCE TO RELATED APPLICATIONS

This application is based on and claims priority under 35 USC 119 from Japanese Patent Application No. 2023-034956 filed Mar. 7, 2023.

BACKGROUND

(i) Technical Field

The present invention relates to an image forming apparatus and a unit for an image forming apparatus.

(ii) Related Art

The formation of an image by an electrophotographic method is performed, for example, by charging a surface of a photoreceptor, forming an electrostatic charge image on the surface of the photoreceptor according to image information, developing the electrostatic charge image with a developer containing a toner to form a toner image, and transferring and fixing the toner image to a surface of a recording medium.

Here, JP2019-197188A discloses "an electrophotographic photoreceptor including a conductive substrate, an undercoat layer provided on the conductive substrate, a charge generation layer provided on the undercoat layer, a charge transport layer provided on the charge generation layer, and an inorganic protective layer provided on the charge transport layer, in which in a case where the film thickness of the layer with the lowest film elastic modulus except for the charge generation layer among the layers provided on the conductive substrate is defined as A, and the total film thickness of the layer provided on the conductive substrate is defined as B, an expression of $0<A/B<0.5$ is satisfied".

JP2020-008688A discloses "an electrophotographic photoreceptor including a conductive substrate, an undercoat layer provided on the conductive substrate, a charge generation layer provided on the undercoat layer, a charge transport layer provided on the charge generation layer, and an inorganic protective layer provided on the charge transport layer, in which the film elastic modulus of each of the undercoat layer, the charge transport layer, and the inorganic protective layer is 5 GPa or greater".

SUMMARY

As an electrophotographic image forming apparatus, "an image forming apparatus (hereinafter, also referred to as "specific image forming apparatus") including an electrophotographic photoreceptor that includes a conductive substrate, a photosensitive layer, and an inorganic surface layer containing a group 13 element and oxygen in this order, a charging device that charges a surface of the electrophotographic photoreceptor, an electrostatic charge image forming device that forms an electrostatic charge image on the charged surface of the electrophotographic photoreceptor, a developing device that accommodates an electrostatic charge image developer containing a toner and a carrier, supplies the electrostatic charge image developer, and develops the electrostatic charge image formed on the surface of the electrophotographic photoreceptor as a toner image, and a transfer device that transfers the toner image formed on the surface of the electrophotographic photoreceptor to a surface of a recording medium" is known (for example, JP2019-197188A and JP2020-008688A).

However, dot reproducibility may be degraded in the specific image forming apparatus.

Aspects of non-limiting embodiments of the present disclosure relate to an image forming apparatus and a unit for an image forming apparatus that are capable of suppressing degradation of dot reproducibility as compared with a case where a volume resistance value of a carrier in the specific image forming apparatus is less than $1\times10^9$ or greater than $1\times10^{16}\Omega$.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Means for achieving the above-described object includes the following aspects.

According to an aspect of the present disclosure, there is provided an image forming apparatus including: an electrophotographic photoreceptor that includes a conductive substrate, a photosensitive layer, and an inorganic surface layer containing a group 13 element and oxygen in this order; a charging device that charges a surface of the electrophotographic photoreceptor; an electrostatic charge image forming device that forms an electrostatic charge image on the charged surface of the electrophotographic photoreceptor; a developing device that accommodates an electrostatic charge image developer containing a toner and a carrier with a volume resistance value of $1\times10^9\Omega$ or greater and $1\times10^{16}\Omega$ or less, supplies the electrostatic charge image developer, and develops the electrostatic charge image formed on the surface of the electrophotographic photoreceptor as a toner image; and a transfer device that transfers the toner image formed on the surface of the electrophotographic photoreceptor to a surface of a recording medium.

BRIEF DESCRIPTION OF THE DRAWINGS

Exemplary embodiment(s) of the present invention will be described in detail based on the following figures, wherein.

DETAILED DESCRIPTION

Figure 1:
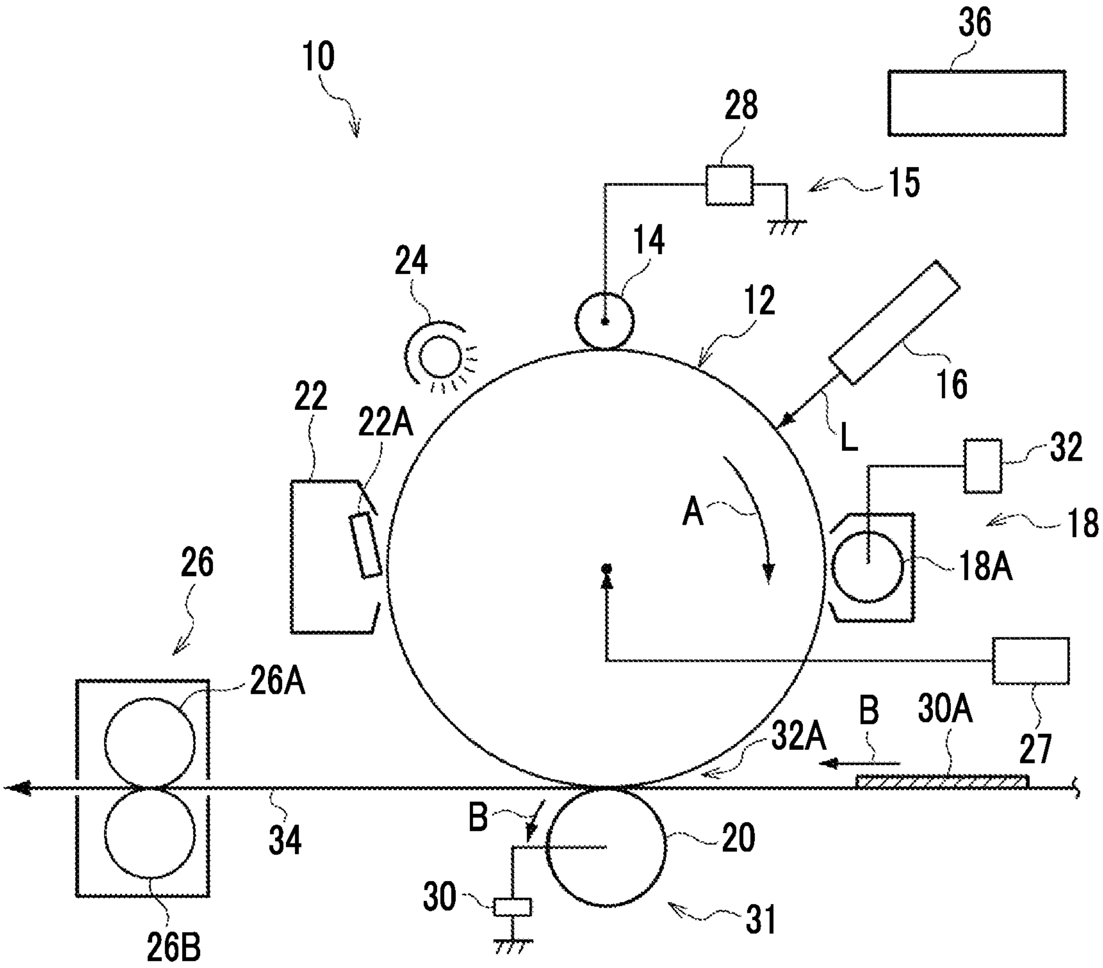
FIG. 1 is a schematic configuration view showing an example of an image forming apparatus according to the present exemplary embodiment.

Hereinafter, exemplary embodiments that are examples of the present invention will be described. The following descriptions and examples merely illustrate the exemplary embodiments, and do not limit the scope of the exemplary embodiments.

In a numerical range described in a stepwise manner in the present specification, an upper limit or a lower limit described in a certain numerical range may be replaced with an upper limit or a lower limit in another numerical range described in a stepwise manner. Further, in a numerical range described in the present specification, an upper limit or a lower limit described in the numerical range may be replaced with a value shown in an example.

Each component may include a plurality of kinds of substances corresponding to each component.

In a case where a plurality of kinds of substances corresponding to each component in a composition are present, the amount of each component in the composition indicates the total amount of the plurality of kinds of substances present in the composition unless otherwise specified.

Image Forming Apparatus

An image forming apparatus according to the present exemplary embodiment is an image forming apparatus including an electrophotographic photoreceptor (hereinafter, also referred to as "photoreceptor"), a charging device that charges a surface of the electrophotographic photoreceptor, an electrostatic charge image forming device that forms an electrostatic charge image on the charged surface of the electrophotographic photoreceptor, a developing device that accommodates an electrostatic charge image developer, supplies the electrostatic charge image developer, and develops the electrostatic charge image formed on the surface of the electrophotographic photoreceptor as a toner image, and a transfer device that transfers the toner image formed on the surface of the electrophotographic photoreceptor to a surface of a recording medium.

Further, the photoreceptor is an inorganic photoreceptor including a conductive substrate, a photosensitive layer, and an inorganic surface layer containing a group 13 element and oxygen in this order.

In addition, the electrostatic charge image developer is an electrostatic charge image developer containing a toner and a carrier with a volume resistance value of $1\times10^{9}\Omega$ or greater and $1\times10^{16}\Omega$ or less.

In the image forming apparatus according to the present exemplary embodiment, degradation of dot reproducibility is suppressed due to the above-described configuration. The reason for this is assumed as follows.

The inorganic protective layer constituting the surface of the photoreceptor has low resistance. Therefore, in a case where the carrier moves to the surface of the photoreceptor and comes into contact with the surface during the development using a developer, electrons are exchanged, the potential of the surface of the photoreceptor is decreased, and the decrease in potential results in surface potential unevenness. As a result, the dot diameter of the toner image developed on the surface of the photoreceptor is changed.

Accordingly, in an image forming apparatus to which a photoreceptor including an inorganic protective layer is applied, variation in the dot diameter may occur, and the dot reproducibility may be degraded.

Meanwhile, in the image forming apparatus according to the present exemplary embodiment, a high-resistance carrier having a volume resistance value of $10^{9}\Omega$ or greater and $10^{16}\Omega$ or less is employed as the carrier. Therefore, even in a case where the carrier comes into contact with the surface of an inorganic protective layer with low resistance, electrons are difficult to exchange, and the potential on the surface of the photoreceptor is difficult to change.

For this reason, the degradation of the dot reproducibility is assumed to be suppressed.

Here, as the image forming apparatus according to the present exemplary embodiment, a known image forming apparatus such as a direct transfer type apparatus that transfers the toner image formed on the surface of the photoreceptor directly to the recording medium, an intermediate transfer type apparatus that primarily transfers the toner image formed on the surface of the photoreceptor to the surface of the intermediate transfer member and secondarily transfers the toner image transferred to the surface of the intermediate transfer member to the surface of the recording medium, a cleaning device cleaning the surface of the electrophotographic photoreceptor by bringing a cleaning blade into contact with the surface, or an apparatus including a charge erasing device that irradiates the surface of the photoreceptor with charge erasing light after the transfer of the toner image and before the charging to erase the charges on the surface is employed.

In a case of the intermediate transfer type apparatus, the transfer device is, for example, configured to include an intermediate transfer member having a surface onto which the toner image is transferred, a primary transfer device primarily transferring the toner image formed on the surface of the photoreceptor to the surface of the intermediate transfer member, and a secondary transfer device secondarily transferring the toner image transferred to the surface of the intermediate transfer member to the surface of the recording medium.

Further, in the image forming apparatus according to the present exemplary embodiment, the portion including at least the photoreceptor may constitute a unit for an image forming apparatus and may have a cartridge structure (that is, a process cartridge) that is attachable to and detachable from the image forming apparatus.

Examples of the unit for an image forming apparatus include a unit including a photoreceptor and a developing device.

Hereinafter, an example of the image forming apparatus according to the present exemplary embodiment will be described, but the present exemplary embodiment is not limited thereto. Further, main parts shown in the figures will be described, but description of other parts will not be provided.

FIG. 1 is a schematic configuration view showing an example of the image forming apparatus according to the present exemplary embodiment.

As shown in FIG. 1, an image forming apparatus 10 according to the present exemplary embodiment is provided with, for example, a photoreceptor 12. The photoreceptor 12 has a columnar shape, is connected to a driving unit 27 such as a motor via a drive force transmission member (not shown) such as a gear, and is rotationally driven by the driving unit 27 around a rotation axis indicated by a black spot. In the example shown in FIG. 1, the photoreceptor 12 is rotationally driven in a direction indicated by an arrow A.

In the periphery of the photoreceptor 12, for example, a charging device 15 (an example of the charging device), an electrostatic charge image forming device 16 (an example of the electrostatic charge image forming device), a developing device 18 (an example of the developing device), a transfer device 31 (an example of the transfer device), a cleaning device 22 (an example of the cleaning device), and a charge erasing device 24 are disposed in order in the rotation direction of the photoreceptor 12. Further, the image forming apparatus 10 is also provided with a fixing device 26 including a fixing member 26A and a pressure member 26B disposed in contact with the fixing member 26A. Further, the image forming apparatus 10 includes a control device 36 that controls the operation of each device (each unit). Further, a unit including the photoreceptor 12, the charging device 15, the electrostatic charge image forming device 16, the developing device 18, the transfer device 31, and the cleaning device 22 corresponds to an image forming unit.

The image forming apparatus 10 may include at least the photoreceptor 12 as a process cartridge integrated with other devices.

Hereinafter, each device (each part) of the image forming apparatus 10 will be described in detail.

Electrophotographic Photoreceptor

The photoreceptor in the image forming apparatus according to the present exemplary embodiment includes a photosensitive layer and an inorganic surface layer on a conductive substrate in this order. The photosensitive layer may be a single layer type photosensitive layer in which the charge generation material and the charge transport material are contained in the same photosensitive layer so that the functions are integrated with each other or a lamination type photosensitive layer in which the functions of the charge generation layer and the charge transport layer are separated from each other. In a case where the photosensitive layer is a lamination type photosensitive layer, the order of the charge generation layer and the charge transport layer is not particularly limited, for example, but it is preferable that the photoreceptor has a configuration in which the charge generation layer, the charge transport layer, and the inorganic surface layer are provided on the conductive substrate in this order. Further, the photoreceptor may include layers other than the above-described layers.

Figure 4:
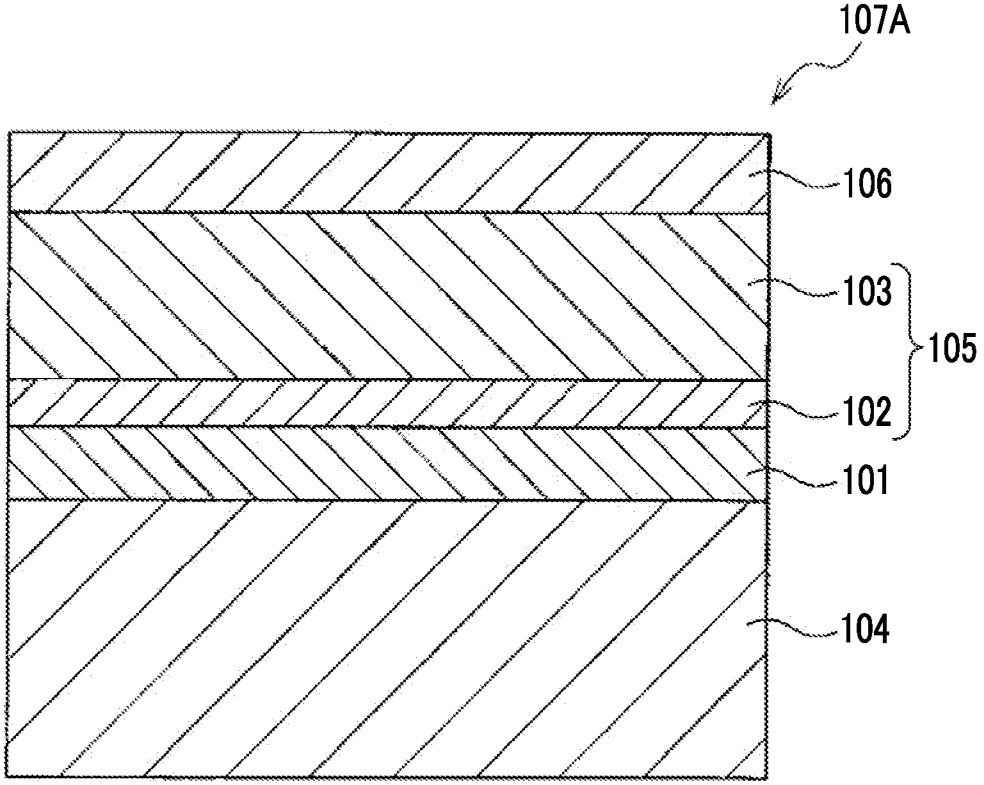
FIG. 4 is a schematic cross-sectional view showing an example of a layer configuration of the electrophotographic photoreceptor in the image forming apparatus according to the present exemplary embodiment.

FIG. 4 is a schematic cross-sectional view showing an example of the layer configuration of the photoreceptor in the image forming apparatus according to the present exemplary embodiment. A photoreceptor 107A has a structure in which an undercoat layer 101 is provided on a conductive substrate 104, and a charge generation layer 102, a charge transport layer 103, and an inorganic surface layer 106 are formed on the undercoat layer 101 in this order. In the photoreceptor 107A, a photosensitive layer 105 whose functions are separated into the charge generation layer 102 and the charge transport layer 103 is formed.

Figure 5:
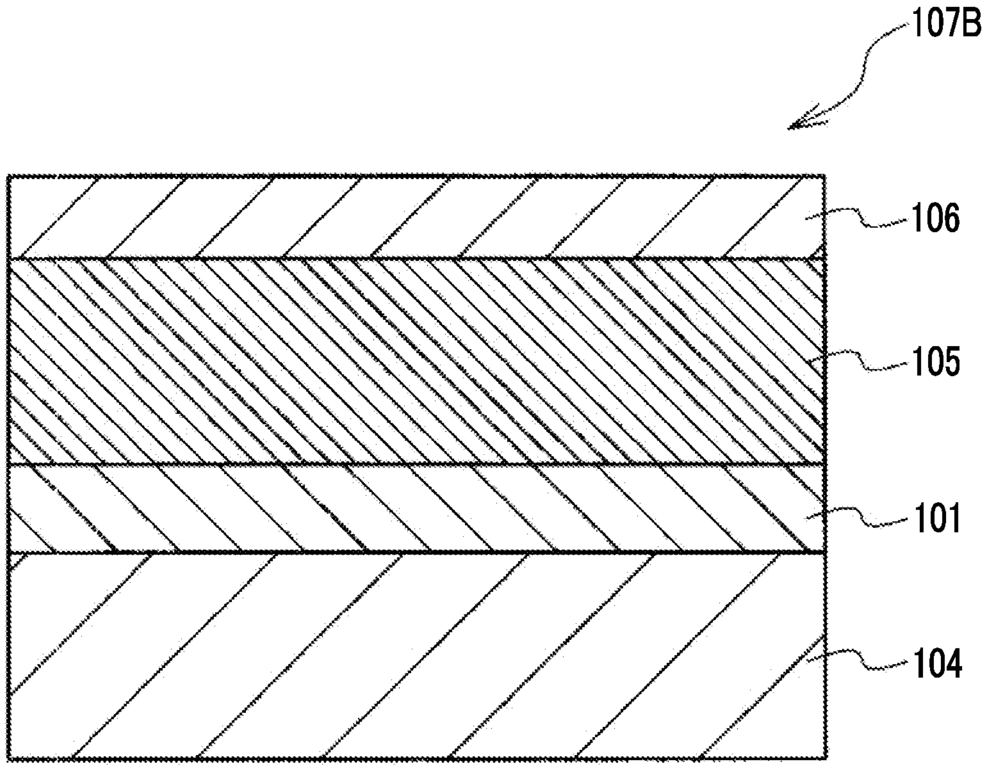
FIG. 5 is a schematic cross-sectional view showing another example of the layer configuration of the electrophotographic photoreceptor in the image forming apparatus according to the present exemplary embodiment.

Further, FIG. 5 is a schematic cross-sectional view showing another example of the layer configuration of the photoreceptor in the image forming apparatus according to the present exemplary embodiment. A photoreceptor 107B shown in FIG. 5 has a structure in which the undercoat layer 101 is provided on the conductive substrate 104, and the photosensitive layer 105 and the inorganic surface layer 106 are formed on the undercoat layer 101 in this order. In the photoreceptor 107B, a single layer type photosensitive layer in which the charge generation material and the charge transport material are contained in the same photosensitive layer 105 so that the functions are integrated with each other is formed.

Further, the photoreceptor in the present exemplary embodiment may or may not be provided with the undercoat layer 101.

Hereinafter, the details of the photoreceptor in the present exemplary embodiment will be described, but the reference numerals will be omitted.

Conductive Substrate

Examples of the conductive substrate include metal plates containing metals (such as aluminum, copper, zinc, chromium, nickel, molybdenum, vanadium, indium, gold, and platinum) or alloys (such as stainless steel), metal drums, metal belts, and the like. Further, examples of the conductive substrate include paper, a resin film, a belt, and the like obtained by being coated, vapor-deposited or laminated with a conductive compound (such as a conductive polymer or indium oxide), a metal (such as aluminum, palladium, or gold) or an alloy. Here, the term "conductive" denotes that the volume resistivity is less than $10^{13}$ Ωcm.

In a case where the electrophotographic photoreceptor is used in a laser printer, for example, it is preferable that the surface of the conductive substrate is roughened such that a centerline average roughness Ra thereof is 0.04 μm or greater and 0.5 μm or less for the purpose of suppressing interference fringes from occurring in a case of irradiation with laser beams. Further, in a case where incoherent light is used as a light source, roughening of the surface to prevent interference fringes is not particularly necessary, and roughening of the surface to prevent interference fringes is appropriate for longer life because occurrence of defects due to the roughness of the surface of the conductive substrate is suppressed.

Examples of the roughening method include wet honing performed by suspending an abrasive in water and spraying the suspension to a support, centerless grinding performed by pressure-welding a conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment performed by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by anodization is chemically active in a natural state, is easily contaminated, and has a large resistance fluctuation depending on the environment. Therefore, for example, it is preferable that a sealing treatment is performed on the porous anodized film so that the fine pores of the oxide film are closed by volume expansion due to a hydration reaction in pressurized steam or boiling water (a metal salt such as nickel may be added thereto) for a change into a more stable a hydrous oxide.

The film thickness of the anodized film is, for example, preferably 0.3 μm or greater and 15 μm or less. In a case where the film thickness is in the above-described range, the barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. In the blending ratio of phosphoric acid, chromic acid, and hydrofluoric acid to the acidic treatment liquid, for example, the concentration of the phosphoric acid is 10% by mass or greater and 11% by mass or less, the concentration of the chromic acid is 3% by mass or greater and 5% by mass or less, and the concentration of the hydrofluoric acid is 0.5% by mass or greater and 2% by mass or less, and the concentration of all these acids may be 13.5% by mass or greater and 18% by mass or less. The treatment temperature is, for example, preferably 42° C. or higher and 48° C. or lower. The film thickness of the coating film is, for example, preferably 0.3 μm or greater and 15 μm or less.

The boehmite treatment is carried out, for example, by immersing the conductive substrate in pure water at 90° C. or higher and 100° C. or lower for 5 minutes to 60 minutes or by bringing the conductive substrate into contact with heated steam at 90° C. or higher and 120° C. or lower for 5 minutes to 60 minutes. The film thickness of the coating film is, for example, preferably 0.1 μm or greater and 5 μm or less. This coating film may be further subjected to the anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is, for example, a layer containing inorganic particles and a binder resin.

Examples of the inorganic particles include inorganic particles having a powder resistance (volume resistivity) of $10^2$ Ωcm or greater and $10^{11}$ Ωcm or less.

Among these, as the inorganic particles having the above-described resistance value, for example, metal oxide particles such as tin oxide particles, titanium oxide particles, zinc oxide particles, and zirconium oxide particles may be used, and zinc oxide particles are particularly preferable.

The specific surface area of the inorganic particles measured by the BET method may be, for example, 10 $m^2$/g or greater.

The volume average particle diameter of the inorganic particles may be, for example, 50 nm or greater and 2,000 nm or less (for example, preferably 60 nm or greater and 1,000 nm or less).

The content of the inorganic particles is, for example, preferably 10% by mass or greater and 80% by mass or less and more preferably 40% by mass or greater and 80% by mass or less with respect to the amount of the binder resin.

The inorganic particles may be subjected to a surface treatment. As the inorganic particles, inorganic particles subjected to different surface treatments or inorganic particles having different particle diameters may be used in the form of a mixture of two or more kinds thereof.

Examples of the surface treatment agent include a silane coupling agent, a titanate-based coupling agent, an aluminum-based coupling agent, and a surfactant. In particular, for example, a silane coupling agent is preferable, and a silane coupling agent containing an amino group is more preferable.

Examples of the silane coupling agent containing an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane, but are not limited thereto.

The silane coupling agent may be used in the form of a mixture of two or more kinds thereof. For example, a silane coupling agent containing an amino group and another silane coupling agent may be used in combination. Examples of other silane coupling agents include vinyltrimethoxysilane, 3-methacryloxypropyl-tris(2-methoxyethoxy)silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane, but are not limited thereto.

The surface treatment method using a surface treatment agent may be any method as long as the method is a known method, and any of a dry method or a wet method may be used.

The treatment amount of the surface treatment agent is, for example, preferably 0.5% by mass or greater and 10% by mass or less with respect to the amount of the inorganic particles.

Here, the undercoat layer may contain an electron-accepting compound (acceptor compound) together with the inorganic particles, for example, from the viewpoint of enhancing the long-term stability of the electrical properties and the carrier blocking properties.

Examples of the electron-accepting compound include electron-transporting substances, for example, a quinone-based compound such as chloranil or bromanil; a tetracyanoquinodimethane-based compound; a fluorenone compound such as 2,4,7-trinitrofluorenone or 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, or 2,5-bis(4-diethylaminophenyl)-1,3,4-oxadiazole; a xanthone-based compound; a thiophene compound; a diphenoquinone compound such as 3,3',5,5'-tetra-t-butyldiphenoquinone; and a benzophenone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable, and specifically, for example, anthraquinone, alizarin, quinizarin, anthrarufin, or purpurin is preferable.

The electron-accepting compound may be contained in the undercoat layer in a state of being dispersed with inorganic particles or in a state of being attached to the surface of each inorganic particle.

Examples of the method of attaching the electron-accepting compound to the surface of the inorganic particle include a dry method and a wet method.

The dry method is, for example, a method of attaching the electron-accepting compound to the surface of each inorganic particle by adding the electron-accepting compound dropwise to inorganic particles directly or by dissolving the electron-accepting compound in an organic solvent while stirring the inorganic particles with a mixer having a large shearing force and spraying the mixture together with dry air or nitrogen gas. The electron-accepting compound may be added dropwise or sprayed, for example, at a temperature lower than or equal to the boiling point of the solvent. After the dropwise addition or the spraying of the electron-accepting compound, the compound may be further baked at 100° C. or higher. The baking is not particularly limited as long as the temperature and the time are adjusted such that the electrophotographic characteristics can be obtained.

The wet method is, for example, a method of attaching the electron-accepting compound to the surface of each inorganic particle by adding the electron-accepting compound to inorganic particles while dispersing the inorganic particles in a solvent using a stirrer, ultrasonic waves, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that the electrophotographic characteristics can be obtained. In the wet method, the moisture contained in the inorganic particles may be removed before the electron-accepting compound is added, and examples thereof include a method of removing the moisture while stirring and heating the moisture in a solvent and a method of removing the moisture by azeotropically boiling the moisture with a solvent.

Further, the electron-accepting compound may be attached to the surface before or after the inorganic particles are subjected to a surface treatment with a surface treatment agent or simultaneously with the surface treatment performed on the inorganic particles with a surface treatment agent.

The content of the electron-accepting compound may be, for example, 0.01% by mass or greater and 20% by mass or less and preferably 0.01% by mass or greater and 10% by mass or less with respect to the amount of the inorganic particles.

Examples of the binder resin used for the undercoat layer include known polymer compounds such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin, a zirconium chelate compound, a titanium chelate compound, an aluminum chelate compound, a titanium alkoxide compound, an organic titanium compound, and known materials such as a silane coupling agent.

Examples of the binder resin used for the undercoat layer include a charge-transporting resin containing a charge-transporting group, and a conductive resin (such as polyaniline).

Among these, as the binder resin used for the undercoat layer, for example, a resin insoluble in a coating solvent of the upper layer is preferable, and a resin obtained by reaction between a curing agent and at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin is particularly preferable.

In a case where these binder resins are used in combination of two or more kinds thereof, the mixing ratio thereof is set as necessary.

The undercoat layer may contain various additives for improving the electrical properties, the environmental stability, and the image quality.

Examples of the additives include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for a surface treatment of the inorganic particles as described above, but may be further added to the undercoat layer as an additive.

Examples of the silane coupling agent serving as an additive include vinyltrimethoxysilane, 3-methacryloxypropyl-tris(2-methoxyethoxy)silane, 2-(3,4-epoxycyclohexyl) ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in the form of a mixture or a polycondensate of a plurality of compounds.

The undercoat layer may have, for example, a Vickers hardness of 35 or greater.

The surface roughness (ten-point average roughness) of the undercoat layer may be adjusted, for example, to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. Further, the surface of the undercoat layer may be polished to adjust the surface roughness. Examples of the polishing method include buff polishing, a sandblast treatment, wet honing, and a grinding treatment.

The formation of the undercoat layer is not particularly limited, and a known forming method is used. For example, a coating film of a coating solution for forming an undercoat layer in which the above-described components are added to a solvent is formed, and the coating film is dried and, as necessary, heated.

Examples of the solvent for preparing the coating solution for forming an undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of these solvents include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming an undercoat layer include known methods such as a roll mill, a ball mill, a vibration ball mill, an attritor, a sand mill, a colloid mill, and a paint shaker.

Examples of the method of coating the conductive substrate with the coating solution for forming an undercoat layer include typical coating methods such as a blade coating method, a wire bar coating method, a spray coating method, a dip coating method, a bead coating method, an air knife coating method, and a curtain coating method.

The film thickness of the undercoat layer is set to, for example, preferably 15 μm or greater and more preferably 20 μm or greater and 50 μm or less.

Interlayer

Although not shown in the figures, an interlayer may be further provided between the undercoat layer and the photosensitive layer.

The interlayer is, for example, a layer containing a resin. Examples of the resin used for the interlayer include a polymer compound, for example, an acetal resin (such as polyvinyl butyral), a polyvinyl alcohol resin, a polyvinyl acetal resin, a casein resin, a polyamide resin, a cellulose resin, gelatin, a polyurethane resin, a polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a phenol-formaldehyde resin, or a melamine resin.

The interlayer may be a layer containing an organometallic compound. Examples of the organometallic compound used for the interlayer include an organometallic compound containing metal atoms such as zirconium, titanium, aluminum, manganese, and silicon.

The compounds used for the interlayer may be used alone or in the form of a mixture or a polycondensate of a plurality of compounds.

Among these, it is preferable that the interlayer is, for example, a layer containing an organometallic compound having a zirconium atom or a silicon atom.

The formation of the interlayer is not particularly limited, and a known forming method is used. For example, a coating film of a coating solution for forming an interlayer in which the above-described components are added to a solvent is formed, and the coating film is dried and, as necessary, heated.

Examples of the coating method of forming the interlayer include typical coating methods such as a dip coating method, a push-up coating method, a wire bar coating method, a spray coating method, a blade coating method, an air knife coating method, and a curtain coating method.

The film thickness of the interlayer is set to be, for example, preferably in a range of 0.1 μm or greater and 3 μm or less. Further, the interlayer may be used as the undercoat layer.

Charge Generation Layer

The charge generation layer is, for example, a layer containing a charge generation material and a binder resin. Further, the charge generation layer may be a deposition layer of the charge generation material. The deposition layer of the charge generation material is, for example, preferable in a case where an incoherent light source such as a light emitting diode (LED) or an organic electroluminescence (EL) image array is used.

Examples of the charge generation material include an azo pigment such as bisazo or trisazo; a fused ring aromatic pigment such as dibromoanthanthrone; a perylene pigment; a pyrrolopyrrole pigment; a phthalocyanine pigment; zinc oxide; and trigonal selenium.

Among these, for example, a metal phthalocyanine pigment or a metal-free phthalocyanine pigment is preferably used as the charge generation material in order to deal with laser exposure in a near infrared region. Specifically, for example, hydroxygallium phthalocyanine, chlorogallium phthalocyanine, dichloro-tin phthalocyanine, and titanyl phthalocyanine are more preferable.

On the other hand, for example, a fused ring aromatic pigment such as dibromoanthanthrone, a thioindigo-based pigment, a porphyrazine compound, zinc oxide, trigonal selenium, or a bisazo pigment is preferable as the charge generation material in order to deal with laser exposure in a near ultraviolet region.

The above-described charge generation material may also be used even in a case where an incoherent light source such as an LED or an organic EL image array having a center wavelength of light emission at 450 nm or greater and 780 nm or less is used, but from the viewpoint of the resolution, the field intensity in the photosensitive layer is increased, and a decrease in charge due to injection of a charge from the substrate, that is, image defects referred to as so-called black spots are likely to occur in a case where a thin film having a thickness of 20 μm or less is used as the photosensitive layer. The above-described tendency is evident in a case where a p-type semiconductor such as trigonal selenium or a phthalocyanine pigment is used as the charge generation material that is likely to generate a dark current.

On the other hand, in a case where an n-type semiconductor such as a fused ring aromatic pigment, a perylene pigment, or an azo pigment is used as the charge generation material, a dark current is unlikely to be generated, and image defects referred to as black spots can be suppressed even in a case where a thin film is used as the photosensitive layer.

Further, the n-type is determined by the polarity of the flowing photocurrent using a typically used time-of-flight method, and a material in which electrons more easily flow as carriers than positive holes is determined as the n-type.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (a polycondensate of bisphenols and aromatic divalent carboxylic acid), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" denotes that the volume resistivity is $10^{13}$ Ωcm or greater. These binder resins may be used alone or in the form of a mixture of two or more kinds thereof.

Further, the blending ratio between the charge generation material and the binder resin is, for example, preferably in a range of 10:1 to 1:10 in terms of the mass ratio.

The charge generation layer may also contain other known additives.

The formation of the charge generation layer is not particularly limited, and a known forming method is used. For example, a coating film of a coating solution for forming a charge generation layer in which the above-described components are added to a solvent is formed, and the coating film is dried and, as necessary, heated. Further, the charge generation layer may be formed by vapor deposition of the charge generation material. The formation of the charge generation layer by vapor deposition is, for example, particularly appropriate in a case where a fused ring aromatic pigment or a perylene pigment is used as the charge generation material.

Examples of the solvent for preparing the coating solution for forming a charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. These solvents are used alone or in the form of a mixture of two or more kinds thereof. As a method of dispersing particles (for example, the charge generation material) in the coating solution for forming a charge generation layer, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type high-pressure homogenizer in which a dispersion liquid is dispersed by a liquid-liquid collision or a liquid-wall collision in a high-pressure state, and a penetration type high-pressure homogenizer in which dispersion is performed by causing a dispersion liquid to pass through a fine flow path in a high-pressure state.

During the dispersion, it is effective to set the average particle diameter of the charge generation material in the coating solution for forming a charge generation layer to 0.5 μm or less, for example, preferably 0.3 μm or less, and more preferably 0.15 μm or less.

Examples of the method of coating the undercoat layer (or the interlayer) with the coating solution for forming a charge generation layer include typical methods such as a blade coating method, a wire bar coating method, a spray coating method, a dip coating method, a bead coating method, an air knife coating method, and a curtain coating method.

The film thickness of the charge generation layer is set to be, for example, in a range of preferably 0.1 μm or greater and 5.0 μm or less and more preferably in a range of 0.2 μm or greater and 2.0 μm or less.

Charge Transport Layer

The charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, or anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material include a positive hole-transporting compound such as a triarylamine-based compound, a benzidine-based compound, an arylalkane-based compound, an aryl-substituted ethylene-based compound, a stilbene-based compound, an anthracene-based compound, or a hydrazone-based compound. These charge transport materials may be used alone or in combination of two or more kinds thereof, but are not limited thereto.

From the viewpoint of the charge mobility, for example, a triarylamine derivative represented by Structural Formula (a-1) or a benzidine derivative represented by Structural Formula (a-2) is preferable as the charge transport material.

(a-1)

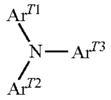

In Structural Formula (a-1), $Ar^{T1}$, $Ar^{T2}$, and $Ar^{T3}$ each independently represent a substituted or unsubstituted aryl group, —$C_6H_4$—$C(R^{T4})$=$C(R^{T5})(R^{T6})$, or —$C_6H_4$—CH=CH—CH=$C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

(a-2)

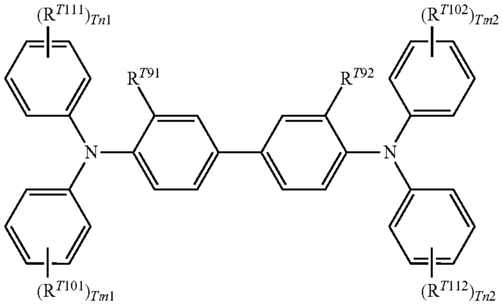

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, a substituted amino group substituted with an alkyl group having 1 or more and 2 or less carbon atoms, a substituted or unsubstituted aryl group, —$C(R^{T12})$=$C(R^{T13})(R^{T14})$, or —CH=CH—CH=$C(R^{T15})(R^{T16})$, and $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or greater and 2 or less.

Examples of the substituent of each group described above include a halogen atom, an alkyl group having 1 or more and 5 or less carbon atoms, and an alkoxy group having 1 or more and 5 or less carbon atoms. Further, examples of the substituent of each group described above include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "—$C_6H_4$—CH=CH—CH=$C(R^{T7})(R^{T8})$" and a benzidine derivative having "—CH=CH—CH=C($R^{T15}$)($R^{T16}$)" are particularly preferable from the viewpoint of the charge mobility.

As the polymer charge transport material, known materials having charge transport properties, such as poly-N-vinylcarbazole and polysilane, can be used. For example, a polyester-based polymer charge transport material is particularly preferable. Further, the polymer charge transport material may be used alone or in combination of binder resins.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among these, for example, a polycarbonate resin or a polyarylate resin is preferable as the binder resin. These binder resins may be used alone or in combination of two or more kinds thereof.

Further, the blending ratio between the charge transport material and the binder resin is, for example, preferably in a range of 10:1 to 1:5 in terms of the mass ratio.

Among the binder resins described above, for example, a polycarbonate resin (a homopolymer type resin of bisphenol A, bisphenol Z, bisphenol C, or bisphenol TP, or a copolymer type resin thereof) is preferable. The polycarbonate resin may be used alone or in combination of two or more kinds thereof. From the same viewpoint as described above, among the polycarbonate resins, for example, a homopolymer type polycarbonate resin of bisphenol Z is more preferable.

The charge transport layer may contain inorganic particles as necessary, in addition to the charge transport material and the binder resin.

In a case where the charge transport layer (that is, the outermost layer of the organic photosensitive layer) contains inorganic particles, cracking of the inorganic surface layer is suppressed. Specifically, it is considered that in a case where the layer constituting the surface of the organic photosensitive layer contains inorganic particles, the inorganic particles function as a reinforcing material for the organic photosensitive layer, and thus the organic photosensitive layer is difficult to deform and cracking of the inorganic surface layer is suppressed. Further, since the charge transport layer (that is, the organic photosensitive layer) contains the inorganic particles, dielectric breakdown of the charge transport layer (that is, the organic photosensitive layer) is unlikely to occur even in a case where the electric field intensity is increased.

Examples of the inorganic particles used in the charge transport layer include silica particles, alumina particles, titanium oxide particles, potassium titanate particles, tin oxide particles, zinc oxide particles, zirconium oxide particles, barium sulfate particles, calcium oxide particles, calcium carbonate particles, and magnesium oxide particles.

Inorganic particles may be used alone or in combination of two or more of kinds thereof.

Among these, from the viewpoint that the dielectric loss factor is high and the electrical properties of the photoreceptor are difficult to degrade and from the viewpoint of suppressing occurrence of cracking in the inorganic surface layer, for example, silica particles are particularly preferable.

Hereinafter, the silica particles appropriate for the charge transport layer will be described in detail.

Examples of the silica particles include dry silica particles and wet silica particles.

Examples of the dry silica particles include silica by a combustion method (fumed silica) obtained by combustion of a silane compound and silica by a deflagration method obtained by explosive combustion of metallic silicon powder.

Examples of the wet silica particles include wet silica particles obtained by a neutralization reaction between sodium silicate and a mineral acid (silica by a precipitation method synthesized and aggregated under alkaline conditions, silica particles by a gelation method synthesized and aggregated under acidic conditions, and the like), colloidal silica particles obtained by alkalifying and polymerizing acidic silicic acid (silica sol particles and the like), and silica particles by a sol-gel method obtained by the hydrolysis of an organic silane compound (for example, alkoxysilane).

Among these, from the viewpoint of suppressing occurrence of the residual potential and suppressing image defects due to degradation of other electrical properties (suppressing degradation of fine line reproducibility), for example, silica particles by a combustion method in which the number of silanol groups in the surface is small and the number of void structure is small are desirable as the silica particles.

For example, the silica particles may have a surface subjected to a surface treatment with a hydrophobic treatment agent. In this manner, the number of silanol groups in the surface of the silica particles is reduced, and the occurrence of the residual potential is easily suppressed.

Examples of the hydrophobic treatment agent include known silane compounds such as chlorosilane, alkoxysilane, and silazane.

Among these, from the viewpoint of easily suppressing occurrence of the residual potential and from the viewpoint of suppressing image density unevenness caused by the charging unevenness of the surface of the photoreceptor, for example, a silane compound containing a trimethylsilyl group, a decylsilyl group, or a phenylsilyl group is desirable as the hydrophobic treatment agent. That is, for example, the surface of the silica particles may contain a trimethylsilyl group, a decylsilyl group, or a phenylsilyl group.

Examples of the silane compound containing a trimethylsilyl group (trimethylsilane compound) include trimethylchlorosilane, trimethylmethoxysilane, and 1,1,1,3,3,3-hexamethyldisilazane.

Examples of the silane compound containing a decylsilyl group (decylsilane compound) include decyltrichlorosilane, decyldimethylchlorosilane, and decyltrimethoxysilane.

Examples of the silane compound containing a phenyl group (phenylsilane compound) include triphenylmethoxysilane and triphenylchlorosilane.

The volume average particle diameter of the inorganic particles containing silica particles is, for example, 20 nm or greater and 200 nm or less, preferably 40 nm or greater and 150 nm or less, more preferably 50 nm or greater and 120 nm or less, and still more preferably 50 nm or greater and 110 nm or less.

In a case where the volume average particle diameter of the inorganic particles is in the above-described ranges, cracking of the inorganic surface layer and occurrence of the residual potential are likely to be suppressed.

The volume average particle diameter of the inorganic particles is measured as follows. Hereinafter, a measuring method in a case of silica particles will be described, but the same measuring method will also be employed in a case of other particles.

The volume average particle diameter of the silica particles is acquired by separating the silica particles from the layer, observing 100 primary particles of the silica particles at a magnification of 40,000 times with a scanning electron microscope (SEM) device, and measuring the longest diameter and the shortest diameter of each particle by image analysis of primary particles, and measuring the sphere equivalent diameter from the median value. A 50% diameter (D50v) of the obtained sphere equivalent diameter in the cumulative frequency is acquired, and the acquired diameter is measured as the volume average particle diameter of the silica particles.

The content of the inorganic particles may be appropriately determined depending on the kind thereof, but from the viewpoint of easily suppressing cracking of the inorganic surface layer and occurrence of the residual potential, the content of the inorganic particles is, for example, preferably 30% by mass or greater, more preferably 40% by mass or greater, still more preferably 50% by mass or greater, and particularly preferably 55% by mass or greater with respect to the entire charge transport layer (solid content).

Further, the upper limit of the content of the inorganic particles is not particularly limited, but may be 90% by mass or less and is, for example, preferably 80% by mass or less, more preferably 70% by mass or less, and still more preferably 65% by mass or less from the viewpoint of ensuring the properties of the charge transport layer.

Further, it is preferable that the content of the inorganic particles is, for example, greater than the content of the charge transport material and is, for example, preferably 55% by mass or greater and 90% by mass or less with respect to the entire charge transport layer (solid content).

The charge transport layer may also contain other known additives.

Characteristics of Charge Transport Layer

The film thickness of the charge transport layer may be, for example, 10 μm or greater and 30 μm or less and is preferably 10 μm or greater and 25 μm or less.

In particular, the film thickness of the charge transport layer may be, for example, 15 μm or greater and 20 μm or less. In a case where the film thickness of the charge transport layer is set to 10 μm or greater and 30 μm or less, the sensitivity of the photoreceptor and the developing electric field are appropriate. As a result, variation in the dot diameter is difficult to occur, and the dot reproducibility is difficult to degrade.

Formation of Charge Transport Layer

The formation of the charge transport layer is not particularly limited, and a known forming method is used. For example, a coating film of a coating solution for forming a charge transport layer in which the above-described components are added to a solvent is formed, and the coating film is dried and, as necessary, heated.

Examples of the solvent for preparing the coating solution for forming a charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. These solvents are used alone or in the form of a mixture of two or more kinds thereof.

Examples of the coating method of coating the charge generation layer with the coating solution for forming a charge transport layer include typical methods such as a blade coating method, a wire bar coating method, a spray coating method, a dip coating method, a bead coating method, an air knife coating method, and a curtain coating method.

Further, in a case where particles (for example, silica particles or fluororesin particles) are dispersed in the coating solution for forming a charge transport layer, as a dispersing method, for example, a media disperser such as a ball mill, a vibration ball mill, an attritor, a sand mill, or a horizontal sand mill, or a medialess disperser such as a stirrer, an ultrasonic disperser, a roll mill, or a high-pressure homogenizer is used. Examples of the high-pressure homogenizer include a collision type homogenizer in which a dispersion liquid is dispersed by a liquid-liquid collision or a liquid-wall collision in a high-pressure state, and a penetration type homogenizer in which a dispersion liquid is dispersed by penetrating the liquid through a fine flow path in a high-pressure state.

Further, after the formation of the charge transport layer and before the formation of the inorganic surface layer, a step in which the atmosphere contained in the organic photosensitive layer formed on the conductive substrate is substituted with gas having an oxygen concentration higher than the oxygen concentration of the atmosphere may be performed as necessary.

Inorganic Surface Layer

Composition and the Like of Inorganic Surface Layer

The inorganic surface layer is a layer formed to contain an inorganic material containing a group 13 element and oxygen.

Examples of the inorganic material containing a group 13 element and oxygen include metal oxides such as gallium oxide, aluminum oxide, indium oxide, and boron oxide, and mixed crystals thereof.

Among these, for example, gallium oxide is particularly preferable as the inorganic material. The gallium oxide has excellent light transmitting properties, particularly n-type conductivity, and excellent conductivity controllability thereof. Particularly, in a case where gallium oxide is employed, that is, gallium is employed as the group 13 element, the hardness of the inorganic surface layer is improved, and the abrasion resistance of the photoreceptor is improved.

The inorganic surface layer may be formed to contain, for example, at least a group 13 element (for example, preferably gallium) and oxygen, and may be formed to contain hydrogen, as necessary. In a case where the inorganic surface layer contains hydrogen, the physical characteristics of the inorganic surface layer formed to contain at least group 13 elements (for example, preferably gallium) and oxygen are easily controlled.

The sum of the element composition ratios of the group 13 elements (particularly gallium) and oxygen to all the elements constituting the inorganic surface layer is, for example, preferably 0.70 atomic % or greater. For example, in a case where group 15 elements such as N, P, and As are mixed, the influence of these elements binding to group 13 elements (particularly gallium) is suppressed, and the composition ratio (oxygen/group 13 elements (particularly gallium)) of oxygen to the group 13 elements (particularly gallium) capable of improving the hardness of the inorganic surface layer and the electrical properties is likely to be adjusted to be in an appropriate range.

From the above-described viewpoint, the sum of the element composition ratios of the group 13 elements (particularly gallium) and oxygen to all the elements constituting the inorganic surface layer may be, for example, 0.75 atomic % or greater, and is preferably 0.80 atomic % or greater and more preferably 0.85 atomic % or greater.

In particular, it is preferable that the inorganic surface layer contains, for example, the group 13 elements, oxygen, and hydrogen and that the sum of the element composition ratios of the group 13 elements, oxygen, and hydrogen to all the elements constituting the inorganic surface layer is 90 atomic % or greater.

Further, the element composition ratio (oxygen/group 13 elements) of oxygen to the group 13 elements is, for example, preferably 1.2 or greater and 1.6 or less and more preferably 1.22 or greater and 1.3 or less.

In a case where the element composition ratio (oxygen/group 13 elements) of the materials constituting the inorganic surface layer is in the above-described ranges, the electrical properties and the abrasion resistance of the photoreceptor are appropriate. As a result, variation in the dot diameter is difficult to occur, and the dot reproducibility is difficult to degrade.

Further, in a case where the sum of the element composition ratios of group 13 elements (particularly gallium), oxygen, and hydrogen to all the elements constituting the inorganic surface layer is 90 atomic % or greater, influence of group 15 elements such as N, P, and As binding to the group 13 elements (particularly gallium) is suppressed in a case of mixing group 15 elements with the group 13 elements, and the composition ratio (oxygen/group 13 elements (particularly gallium)) of oxygen to the group 13 elements (particularly gallium) capable of improving the hardness and electrical properties of the inorganic surface layer is easily adjusted to be in an appropriate range. From the above-described viewpoint, the sum of the element composition ratios is, for example, preferably 95 atomic % or greater, more preferably 96 atomic % or greater, and still more preferably 97 atomic % or greater.

In addition to the above-described inorganic material, the inorganic surface layer may contain one or more elements selected from C, Si, Ge, and Sn in a case of n-type, for example, for controlling the conductive type. Further, for example, in a case of p-type, one or more elements selected from N, Be, Mg, Ca, and Sr may be contained.

Here, in a case where the inorganic surface layer is formed to contain gallium and oxygen and, as necessary, hydrogen, an appropriate element composition ratio is, for example, as follows, from the viewpoint of excellent mechanical strength, light transmitting properties, flexibility, and excellent conductivity controllability.

The element composition ratio of gallium may be, for example, 15 atomic % or greater and 50 atomic % or less, and is desirably 20 atomic % or greater and 40 atomic % or less and more desirably 20 atomic % or greater and 30 atomic % or less with respect to all constituent elements of the inorganic surface layer.

The element composition ratio of oxygen may be, for example, 30 atomic % or greater and 70 atomic % or less, and is desirably 40 atomic % or greater and 60 atomic % or less and more desirably 45 atomic % or greater and 55 atomic % or less with respect to all constituent elements of the inorganic surface layer.

The element composition ratio of hydrogen may be, for example, 10 atomic % or greater and 40 atomic % or less, and is desirably 15 atomic % or greater and 35 atomic % or less and more desirably 20 atomic % or greater and 30 atomic % or less with respect to all constituent elements of the inorganic surface layer.

Here, the element composition ratio, the atomic number ratio, and the like of each element in the inorganic surface layer are acquired by Rutherford backscattering (hereinafter, referred to as "RBS") including the distribution in a thickness direction.

In RBS, 3SDH Pelletron (manufactured by NEC) is used as an accelerator, RBS-400 (manufactured by CE & A) is used as an end station, and 3S-R10 is used as a system. The HYPRA program or the like of CE & A is used for analysis.

Measurement conditions of RBS are that He++ ion beam energy is 2.275 eV, a detection angle is 160°, and a Grazing Angle is about 109° with respect to an incident beam.

Specifically, the RBS measurement is performed as follows.

First, the He++ ion beam is incident perpendicular to a sample, a detector is set at 160° with respect to the ion beam, and a backscattered He signal is measured. A composition ratio and a film thickness are determined from the detected He energy and intensity. A spectrum may be measured at two detection angles in order to improve an accuracy of determining the composition ratio and the film thickness. The accuracy is improved by measuring and cross-checking at two detection angles with different depth direction resolution or backscattering mechanics.

The number of He atoms backscattered by a target atom is determined only by three factors: 1) the atomic number of a target atom, 2) the energy of the He atom before scattering, and 3) the scattering angle.

A density is assumed by calculation from the measured composition, and the thickness is calculated using this assumption. A density error is within 20%.

The element composition ratio of hydrogen is determined by hydrogen forward scattering (hereinafter referred to as "HFS").

In HFS measurement, 3SDH Pelletron manufactured by NEC is used as an accelerator, RBS-400 manufactured by CE & A is used as an end station, and 3S-R10 is used as a system. The HYPRA program of CE & A is used for analysis. Moreover, the measurement conditions for HFS are as follows.

Het++ ion beam energy: 2.275 eV

Detection angle: Grazing Angle 30° for an incident beam of 160°

The HFS measurement picks up a signal of hydrogen scattered in front of the sample by setting a detector at 30° to the He++ ion beam and the sample at 75° from the normal line. For example, in this case, the detector may be covered with aluminum foil to remove He atoms scattered with hydrogen. Quantification is performed by standardizing hydrogen counts of a reference sample and a sample to be measured, by stopping power and then comparing the counts. As a reference sample, a sample in which H is ion-implanted into Si and muscovite are used.

Muscovite is known to have a hydrogen concentration of 6.5 atomic %.

The H adsorbed on the outermost surface is corrected, for example, by subtracting the amount of H adsorbed on the clean Si surface.

Further, the inorganic surface layer may have a composition ratio distribution in the thickness direction depending on the purpose, or may have a multi-layer structure.

Characteristics of Inorganic Surface Layer

It is desirable that the inorganic surface layer is, for example, a non-single crystal film such as a microcrystalline film, a polycrystalline film, or an amorphous film. Among these, for example, amorphous is particularly desirable in terms of surface smoothness, and is more desirably a microcrystalline film in terms of hardness.

A growth cross section of the inorganic surface layer may have a columnar structure and has, for example, desirably a structure with high flatness and is desirably amorphous from the viewpoint of slipperiness.

The crystallinity and amorphousness are determined by the presence or absence of points or lines in a diffraction image obtained by reflection high-energy electron diffraction (RHEED) measurement.

The elastic modulus of the inorganic surface layer is, for example, preferably 80 GPa or greater. Here, the upper limit of the elastic modulus of the inorganic surface layer is, for example, 130 GPa or less from the viewpoint of material properties.

In a case where the elastic modulus of the inorganic surface layer is set to be in the above-described ranges, abrasion of the photoreceptor is further suppressed.

The elastic modulus of the inorganic surface layer is measured as follows.

The elastic modulus of the inorganic surface layer is acquired by performing measurement on the inorganic surface layer on the surface of the photoreceptor using a nanoindenter (product name: PICODENTOR HM500, manufactured by Fischer Instruments K.K.) with a test load of 0.5 mN, a 115° triangular pyramidal indenter as an indenter type, and a Berkovich type diamond indenter. Further, the measurement is performed under conditions of a temperature of 23° C. and a humidity of 65% RH in a standard state defined by the Japanese Industrial Standards.

The film thickness of the inorganic surface layer is, for example, preferably 0.1 μm or greater, more preferably 0.2 μm or greater and 10.0 μm or less, and still more preferably 0.4 μm or greater and 5.0 μm or less.

In particular, the film thickness of the inorganic surface layer may be, for example, 0.5 μm or greater and 10 μm or less (for example, preferably 1 μm or greater and 6 μm or less). In a case where the film thickness of the inorganic surface layer is set to 0.5 μm or greater and 10 μm or less, the electrical properties and the abrasion resistance of the photoreceptor are appropriate. As a result, variation in the dot diameter is difficult to occur, and the dot reproducibility is difficult to degrade.

Formation of Inorganic Surface Layer

For the formation of the protective layer, for example, known vapor phase deposition methods such as a plasma chemical vapor deposition (CVD) method, an organic metal vapor phase growth method, a molecular beam epitaxy method, vapor deposition, and sputtering are used.

Hereinafter, the formation of the inorganic surface layer will be described with reference to specific examples by showing an example of a film forming device in the drawings. Further, a method of forming an inorganic surface layer formed to contain gallium, oxygen, and hydrogen will be described below, but the method is not limited thereto, and a known forming method may be employed depending on the composition of the target inorganic surface layer.

Figure 2A:
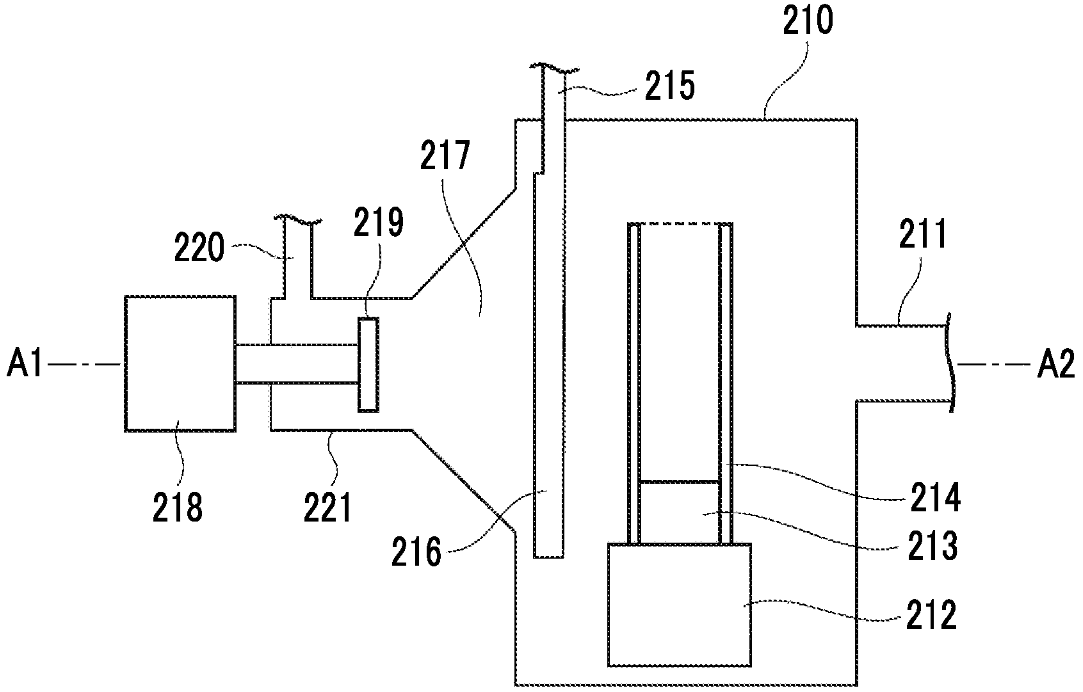
FIGS. 2A and 2B are schematic views schematically showing an example of a film forming device used for forming an inorganic protective layer of an electrophotographic photoreceptor according to the present exemplary embodiment.
Figure 2B:
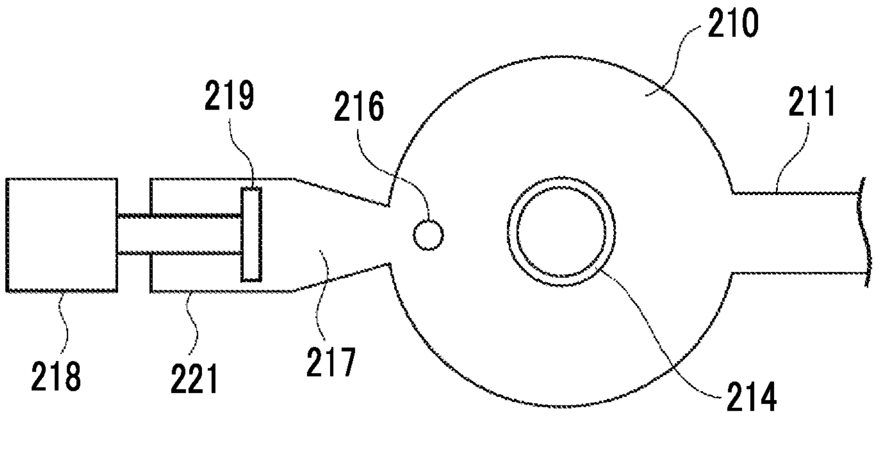

FIGS. 2A and 2B are schematic views schematically showing an example of a film forming device used for forming the inorganic surface layer of the electrophotographic photoreceptor according to the present exemplary embodiment, and FIG. 2A is a schematic cross-sectional view in a case where the film forming device is viewed from a side surface, and FIG. 2B is a schematic cross-sectional view taken along line A1-A2 of the film forming device shown in FIG. 2A. In FIGS. 2A and 2B, the reference numeral 210 represents a film forming chamber, the reference numeral 211 represents an exhaust port, the reference numeral 212 represents a substrate rotating portion, the reference numeral 213 represents a substrate support member, the reference numeral 214 represents a substrate, the reference numeral 215 represents a gas introduction pipe, the reference numeral 216 represents a shower nozzle having an opening for injecting gas introduced from the gas introduction pipe 215, the reference numeral 217 represents a plasma diffusion unit, the reference numeral 218 represents a high-frequency power supply unit, the reference numeral 219 represents a flat plate electrode, the reference numeral 220 represents a gas introduction pipe, and the reference numeral 221 represents a high-frequency discharge pipe portion.

In the film forming device shown in FIGS. 2A and 2B, the exhaust port 211 connected to a vacuum exhaust device (not shown) is provided at one end of the film forming chamber 210, and a plasma generator consisting of the high-frequency power supply unit 218, the flat plate electrode 219, and the high-frequency discharge pipe portion 221 is provided on a side of the film forming chamber 210 opposite to a side where the exhaust port 211 is provided.

The plasma generator is formed of the high-frequency discharge pipe portion 221, the flat plate electrode 219 disposed in the high-frequency discharge pipe portion 221 and having a discharge surface provided on a side of the exhaust port 211, and the high-frequency power supply unit 218 disposed outside the high-frequency discharge pipe portion 221 and connected to the surface opposite to the discharge surface of the flat plate electrode 219. Further, the gas introduction pipe 220 for supplying gas into the high-frequency discharge pipe portion 221 is connected to the high-frequency discharge pipe portion 221, and the other end of the gas introduction pipe 220 is connected to a first gas supply source (not shown).

Figure 3:
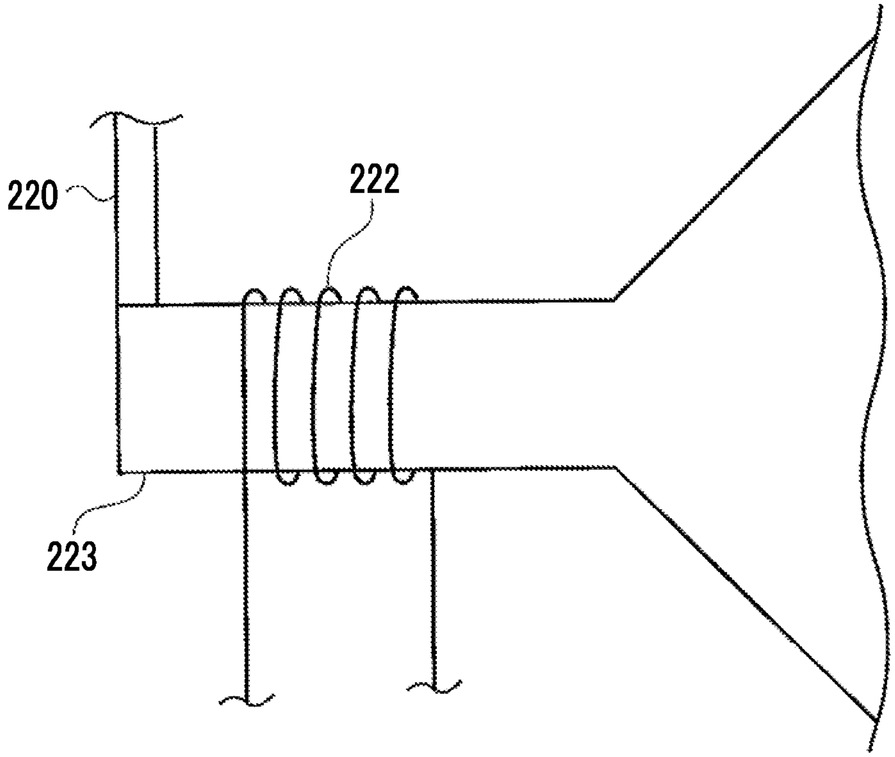
FIG. 3 is a schematic view schematically showing an example of a plasma generator used for forming the inorganic protective layer of the electrophotographic photoreceptor according to the present exemplary embodiment.

Further, the plasma generator shown in FIG. 3 may be used in place of the plasma generator provided in the film forming device shown in FIGS. 2A and 2B. FIG. 3 is a schematic view schematically showing another example of the plasma generator used in the film forming device shown in FIG. 4, and is a side view of the plasma generator. In FIG. 3, the reference numeral 222 represents a high-frequency coil, the reference numeral 223 represents a quartz pipe, and the reference numeral 220 represents the same gas introduction pipe as shown in FIGS. 2A and 2B. The plasma generator consists of the quartz pipe 223 and the high-frequency coil 222 provided along the outer peripheral surface of the quartz pipe 223, and one end of the quartz pipe 223 is connected to the film forming chamber 210 (not shown in FIG. 3). Further, the gas introduction pipe 220 for introducing gas into the quartz pipe 223 is connected to the other end of the quartz pipe 223.

In FIGS. 2A and 2B, the rod-like shower nozzle 216 extending along the discharge surface is connected to the discharge surface side of the flat plate electrode 219, one end of the shower nozzle 216 is connected to the gas introduction pipe 215, and the gas introduction pipe 215 is connected to a second gas supply source (not shown) provided outside the film forming chamber 210.

Further, the substrate rotating portion 212 is provided in the film forming chamber 210, and the cylindrical substrate 214 is attached to the substrate rotating portion 212 via the substrate support member 213 such that the shower nozzle 216 in the longitudinal direction and the substrate 214 in the axial direction face each other. In the film formation, the substrate 214 rotates in the circumferential direction along with the rotation of the substrate rotating portion 212. For example, a photoreceptor or the like laminated up to an organic photosensitive layer in advance is used as the substrate 214.

The formation of the inorganic surface layer is carried out, for example, in the following manner.

First, oxygen gas (or helium (He) diluted oxygen gas), helium (He) gas, and, as necessary, hydrogen ($H_2$) gas are introduced into the high-frequency discharge pipe portion 221 from the gas introduction pipe 220, and a radio wave at a frequency of 13.56 MHz is supplied from the high-frequency power supply unit 218 to the flat plate electrode 219. Here, the plasma diffusion unit 217 is formed such that the plasma diffusion unit radially extends from the discharge surface side of the flat plate electrode 219 to the exhaust port 211 side. Here, the gas introduced from the gas introduction pipe 220 flows through the film forming chamber 210 from the flat plate electrode 219 side to the exhaust port 211 side. The flat plate electrode 219 may be formed such that the electrode is surrounded by an earth shield.

Next, a non-single crystal film containing gallium, oxygen, and hydrogen is formed on the surface of the substrate 214 by introducing trimethyl gallium gas into the film forming chamber 210 via the gas introduction pipe 215 and the shower nozzle 216 positioned on the downstream side of the flat plate electrode 219 serving as an activation device.

As the substrate 214, for example, a substrate on which an organic photosensitive layer is formed is used.

The temperature of the surface of the substrate 214 in the film formation of the inorganic surface layer is, for example, desirably 150° C. or lower, more desirably 100° C. or lower, and particularly desirably 30° C. or higher and 100° C. or lower because an organic photoreceptor including an organic photosensitive layer is used.

In a case where the temperature of the surface of the substrate 214 is 150° C. or lower at the beginning of the film formation, but is higher than 150° C. due to the influence of the plasma, since the organic photosensitive layer may be damaged due to heat, for example, it is desirable that the surface temperature of the substrate 214 is controlled in consideration of the influence.

The temperature of the surface of the substrate 214 may be controlled by at least one of a heating device or a cooling device (not shown in the drawing) or may be controlled by a natural increase in temperature during discharging. In a case where the substrate 214 is heated, a heater may be installed on the outside or inside of the substrate 214. In a case where the substrate 214 is cooled, gas or a liquid for cooling may be circulated inside the substrate 214.

In a case where an increase in the temperature of the surface of the substrate 214 due to discharge is intended to be avoided, it is effective to adjust the high-energy gas flow coming into contact with the surface of the substrate 214. In this case, the conditions such as the gas flow rate, the discharge output, and the pressure are adjusted to obtain a required temperature.

Further, an organometallic compound containing aluminum in place of trimethyl gallium gas or a hydroxide such as diborane can also be used, and two or more kinds thereof may be mixed.

For example, in a case where a film containing nitrogen and indium is formed on the substrate 214 by introducing trimethyl indium into the film forming chamber 210 via the gas introduction pipe 215 and the shower nozzle 216 at the initial stage of the formation of the inorganic surface layer, the film absorbs ultraviolet rays that are generated and deteriorate the organic photosensitive layer in a case of continuous film formation. Therefore, damage to the organic photosensitive layer due to the generation of ultraviolet rays in the film formation is suppressed.

As a method of doping the dopant in the film formation, $SiH_3$ or $SnH_4$ for an n-type, or biscyclopentadienyl magnesium, dimethyl calcium, or dimethyl strontium for a p-type is used in a gas state. Further, the dopant element is doped into the surface layer by a known method such as a thermal diffusion method or an ion implantation method.

Specifically, a conductive type inorganic surface layer of an n-type, a p-type, or the like is obtained, for example, by introducing gas containing at least one or more dopant elements into the film forming chamber 210 via the gas introduction pipe 215 and the shower nozzle 216.

In the film forming device described with reference to FIGS. 2A, 2B, and 3, active nitrogen or active hydrogen formed by the discharge energy may be independently controlled by providing a plurality of activation devices, or gas having both nitrogen atoms and hydrogen atoms at the same time, such as $NH_3$, may also be used. Further, $H_2$ may be added. Further, the conditions for liberating and generating active hydrogen from the organometallic compound may be used.

In this manner, carbon atoms, gallium atoms, nitrogen atoms, hydrogen atoms, and the like, which have been activated, are present on the surface of the substrate 214 in a controlled state. Further, the activated hydrogen atoms have an effect of desorbing hydrogen of a hydrocarbon group such as a methyl group or an ethyl group constituting an organometallic compound as a molecule.

Therefore, a hard film (inorganic surface layer) constituting a three-dimensional bond is formed.

The plasma generator of the film forming device shown in FIGS. 2A, 2B, and 3 uses a high-frequency oscillation device, but the present invention is not limited thereto, and for example, a microwave oscillation device or an electrocyclotron resonance type or a helicon plasma type device may be used. Further, in a case of a high-frequency oscillation device, an inductive type or a capacitive type may be used.

Further, two or more kinds of these devices may be used in combination, or two or more of the same devices may be used. In order to suppress an increase in the temperature of the surface of the substrate 214 due to irradiation with plasma, for example, a high-frequency oscillation device is desirable, but a device that suppresses irradiation with heat may be provided. In a case where two or more different kinds of plasma generators are used, for example, it is desirable that discharge occurs simultaneously at the same pressure in the plasma generators. Further, a pressure difference may be provided between a region of discharge and a region of film formation (portion where a substrate is installed). These devices may be arranged in series with respect to the gas flow formed in the film forming device from the portion where the gas is introduced to the portion where the gas is discharged, or all the devices may be arranged to face the film forming surface of the substrate.

For example, in a case where two kinds of plasma generators are installed in series with respect to the gas flow, according to the example of the film forming device shown in FIGS. 2A and 2B, the plasma generators may be used as the second plasma generator that causes a discharge in the film forming chamber 210 using the shower nozzle 216 as an electrode. In this case, for example, a high-frequency voltage is applied to the shower nozzle 216 via the gas introduction pipe 215 to cause a discharge in the film forming chamber 210 using the shower nozzle 216 as an electrode. Alternatively, a cylindrical electrode is provided between the substrate 214 and the flat plate electrode 219 in the film forming chamber 210 instead of using the shower nozzle 216 as an electrode, and the cylindrical electrode is used to cause a discharge in the film forming chamber 210.

Further, in a case where two different kinds of plasma generators are used under the same pressure and, for example, in a case where a microwave oscillation device and a high-frequency oscillation device are used, the excitation energies of the excitation species can be greatly changed, and the film quality can be effectively controlled. Further, the discharge may be performed at the vicinity of the atmospheric pressure (70,000 Pa or greater and 110,000 Pa or less). In a case of performing discharge at the vicinity of the atmospheric pressure, for example, it is desirable to use He as a carrier gas.

In the formation of the inorganic surface layer, for example, the substrate 214 in which an organic photosensitive layer is formed on the substrate is installed in the film forming chamber 210, and mixed gases having different compositions are introduced, thereby forming the inorganic surface layer.

Further, for example, in a case of performing discharge by high-frequency discharge, the frequency is desirably set to be in a range of 10 kHz or greater and 50 MHz or less as a film forming condition in order to carry out satisfactory film formation at a low temperature. Further, the output depends on the size of the substrate 214, for example, but is desirably set to be in a range of 0.01 $W/cm^2$ or greater and 0.2 $W/cm^2$ or less with respect to the surface area of the substrate. The rotation speed of the substrate 214 is, for example, desirably in a range of 0.1 rpm or greater and 500 rpm or less.

Single Layer Type Photosensitive Layer

The single layer type photosensitive layer (charge generation/charge transport layer) is, for example, a layer containing a charge generation material, a charge transport material, a binder resin, and as necessary, other known additives. Further, these materials are the same as the materials described in the sections of the charge generation layer and the charge transport layer.

Further, the content of the charge generation material in the single layer type photosensitive layer may be, for example, 0.1% by mass or greater and 10% by mass or less and preferably 0.8% by mass or greater and 5% by mass or less with respect to the total solid content. Further, the content of the charge transport material in the single layer type photosensitive layer may be, for example, 5% by mass or greater and 50% by mass or less with respect to the total solid content.

The method of forming the single layer type photosensitive layer is the same as the method of forming the charge generation layer or the charge transport layer.

The film thickness of the single layer type photosensitive layer may be, for example, 5 μm or greater and 50 μm or less and preferably 10 μm or greater and 40 μm or less.

Charging Device

The charging device 15 charges the surface of the photoreceptor 12. The charging device 15 is provided, for example, on the surface of the photoreceptor 12 in a contact or non-contact manner and includes a charging member 14 that charges the surface of the photoreceptor 12 and a power supply 28 (an example of a voltage applying unit for the charging member) that applies a charging voltage to the charging member 14. The power supply 28 is electrically connected to the charging member 14.

Examples of the charging member 14 of the charging device 15 include a contact type charger using a conductive charging roller, a charging brush, a charging film, a charging rubber blade, a charging tube, or the like. Further, examples of the charging member 14 also include a known charger such as a non-contact type roller charger, or a scorotron charger or a corotron charger using corona discharge.

In particular, from the viewpoint that the surface of the charging member is not contaminated by a lubricant, for example, it is preferable that a charging member that charges the photoreceptor in a non-contact manner is used as the charging device.

Electrostatic Charge Image Forming Device

The electrostatic charge image forming device 16 forms an electrostatic charge image on the surface of the charged photoreceptor 12. Specifically, for example, the electrostatic charge image forming device 16 irradiates the surface of the photoreceptor 12 charged by the charging member 14 with light L modulated based on image information of an image to be formed so that an electrostatic charge image according to the image of image information is formed on the photoreceptor 12.

Examples of the electrostatic charge image forming device 16 include an optical system device that includes a light source imagewise-exposing the surface of the electrophotographic photoreceptor to light such as a semiconductor laser beam, LED light, or liquid crystal shutter light.

Developing Device

The developing device 18 is provided, for example, on the downstream side of the photoreceptor 12 in a rotation direction with respect to an irradiation position of the light L using the electrostatic charge image forming device 16. An accommodating portion that accommodates a developer is provided in the developing device 18. An electrostatic charge image developer having a toner is accommodated in this accommodating portion. The toner is accommodated, for example, in a charged state in the developing device 18.

The developing device 18 includes, for example, a developing member 18A that develops the electrostatic charge image formed on the surface of the photoreceptor 12 with a developer containing a toner and a power supply 32 that applies a developing voltage to the developing member 18A. The developing member 18A is electrically connected to, for example, the power supply 32.

The developing member 18A of the developing device 18 is selected depending on the kind of developer, and examples thereof include a developing roll having a developing sleeve with a built-in magnet.

The developing device 18 (including the power supply 32) is, for example, electrically connected to the control device 36 provided in the image forming apparatus 10, is driven and controlled by the control device 36, and applies a developing voltage to the developing member 18A. The developing member 18A to which the developing voltage has been applied is charged with a developing potential according to the developing voltage. Further, the developing member 18A charged with the developing potential, for example, holds the developer accommodated in the developing device 18 on the surface and supplies the toner contained in the developer to the surface of the photoreceptor 12 from the inside of the developing device 18. The formed electrostatic charge image is developed as a toner image on the surface of the photoreceptor 12 to which the toner has been supplied.

Transfer Device

The transfer device 31 is provided, for example, on the downstream side of the photoreceptor 12 in the rotation direction with respect to the position where the developing member 18A is disposed. The transfer device 31 includes, for example, a transfer member 20 that transfers a toner image formed on the surface of the photoreceptor 12 to a recording medium 30A and a power supply 30 that applies a transfer voltage to the transfer member 20. The transfer member 20 has, for example, a columnar shape and transports the recording medium 30A in a state of sandwiching the recording medium 30A between the photoreceptor 12 and the transfer member 20. The transfer member 20 is, for example, electrically connected to the power supply 30.

Examples of the transfer member 20 include a contact type transfer charger using a belt, a roller, a film, a rubber cleaning blade, or the like and a known non-contact type transfer charger such as a scorotron transfer charger or a corotron transfer charger using corona discharge.

The transfer device 31 (including the power supply 30) is, for example, electrically connected to the control device 36 provided in the image forming apparatus 10, is driven and controlled by the control device 36, and applies a transfer voltage to the transfer member 20. The transfer member 20 to which the transfer voltage has been applied is charged with a transfer potential according to the transfer voltage.

In a case where a transfer voltage having a polarity opposite to the polarity of the toner constituting the toner image formed on the photoreceptor 12 is applied to the transfer member 20 from the power supply 30 of the transfer member 20, a transfer electric field with an electric field intensity for moving each toner constituting the toner image on the photoreceptor 12 to the transfer member 20 side from the photoreceptor 12 using an electrostatic force is formed, for example, in a region where the photoreceptor 12 and the transfer member 20 face each other (see a transfer region 32A in FIG. 1).

The recording medium 30A is, for example, accommodated in an accommodating portion (not shown), is transported from the accommodating portion along a transport path 34 by a plurality of transporting members (not shown), and reaches the transfer region 32A, which is the region where the photoreceptor 12 and the transfer member 20 face each other. In the example shown in FIG. 1, the recording medium 30A is transported in a direction indicated by an arrow B. In the recording medium 30A that has reached the transfer region 32A, for example, the toner image on the photoreceptor 12 is transferred by the transfer electric field formed in the region by application of the transfer voltage to the transfer member 20. That is, for example, the toner image is transferred onto the recording medium 30A by the movement of the toner from the surface of the photoreceptor 12 to the recording medium 30A. Further, the toner image on the photoreceptor 12 is transferred onto the recording medium 30A by the transfer electric field.

Cleaning Device

The cleaning device 22 is provided on the downstream side of the photoreceptor 12 in the rotation direction with respect to the transfer region 32A. The cleaning device 22 cleans the residual toner adhered to the photoreceptor 12 after the toner image is transferred to the recording medium 30A. The cleaning device 22 cleans an adhesive material such as paper dust in addition to the residual toner.

The cleaning device 22 includes the cleaning blade 22A and brings the tip of the cleaning blade 22A into contact with the photoreceptor 12 in a direction facing the rotation direction to remove the adhesive material on the surface of the photoreceptor 12.

The cleaning blade 22A is a plate-like material having elasticity. As a material constituting the cleaning blade 22A, for example, elastic materials such as silicone rubber, fluororubber, ethylene-propylene-diene rubber, and polyurethane rubber are used. Among these, from the viewpoints of excellent mechanical properties such as the abrasion resistance, the chipping resistance, and the creep resistance, polyurethane rubber is preferable.

The cleaning blade 22A is formed such that a support member is bonded to a surface side opposite to the surface in contact with the photoreceptor 12 and the cleaning blade is supported by this support member. The cleaning blade 22A is pressed against the photoreceptor 12 by the support member due to the pressing pressure. Examples of the support member include metal materials such as aluminum and stainless steel. In addition, an adhesive layer formed of an adhesive or the like for bonding the support member and the cleaning blade 22A may be provided therebetween.

The cleaning device may include known members in addition to the cleaning blade 22A and the support member that supports the cleaning blade 22A.

Charge Erasing Device

The charge erasing device 24 is provided, for example, on a downstream side of the photoreceptor 12 in the rotation direction with respect to the cleaning device 22. The charge erasing device 24 exposes the surface of the photoreceptor 12 to erase the charges on the surface after the toner image is transferred. Specifically, for example, the charge erasing device 24 is electrically connected to the control device 36 provided in the image forming apparatus 10 and is driven and controlled by the control device 36 to expose all surfaces of the photoreceptor 12 (specifically, for example, the entire surface of the image forming area) so that the charges on the surfaces are erased.

Examples of the charge erasing device 24 include a device having a light supply such as a tungsten lamp that irradiates white light and a device having a light source such as a light emitting diode (LED) that irradiates red light.

Fixing Device

The fixing device 26 is provided, for example, on a downstream side of the transport path 34 of the recording medium 30A in the transport direction with respect to the transfer region 32A. The fixing device 26 has a fixing member 26A and a pressure member 26B disposed in contact with the fixing member 26A and fixes the toner image transferred onto the recording medium 30A at a contact portion between the fixing member 26A and the pressure member 26B. Specifically, for example, the fixing device 26 is electrically connected to the control device 36 provided in the image forming apparatus 10, is driven and controlled by the control device 36, and fixes the toner image transferred onto the recording medium 30A to the recording medium 30A by heat and a pressure.

Examples of the fixing device 26 include a fixing machine known per se, such as, a thermal roller fixing machine or an oven fixing machine.

Specifically, for example, a known fixing device including a fixing roll or a fixing belt as the fixing member 26A and a pressure roll or a pressure belt as the pressure member 26B is employed as the fixing device 26.

Here, the recording medium 30A transported along the transport path 34 and to which the toner image is transferred by passing through a region (transfer region 32A) where the photoreceptor 12 and the transfer member 20 face each other reaches, for example, the installation position of the fixing device 26 along the transport path 34 by the transporting member (not shown) so that the toner image is fixed onto the recording medium 30A.

The recording medium 30A in which the image is formed by fixing the toner image is discharged to the outside of the image forming apparatus 10 by a plurality of transporting members (not shown). Further, the photoreceptor 12 is charged with a charging potential by the charging device 15 again after the charges are erased by the charge erasing device 24.

Operation of Image Forming Apparatus

An example of the operation of the image forming apparatus 10 according to the present exemplary embodiment will be described. Further, various operations of the image forming apparatus 10 are performed by a control program executed by the control device 36.

The image forming operation of the image forming apparatus 10 will be described.

First, the surface of the photoreceptor 12 is charged by the charging device 15. The electrostatic charge image forming device 16 exposes the surface of the charged photoreceptor 12 based on the image information. In this manner, an electrostatic charge image according to the image information is formed on the photoreceptor 12. In the developing device 18, the electrostatic charge image formed on the surface of the photoreceptor 12 is developed by a developer containing a toner. In this manner, a toner image is formed on the surface of the photoreceptor 12. Further, particles of the fatty acid metal salt are added to the developer (toner thereof) accommodated in the developing device 18, and particles of the fatty acid metal salt are also supplied to the surface of the photoreceptor 12 together with the toner.

In the transfer device 31, the toner image formed on the surface of the photoreceptor 12 is transferred to the recording medium 30A. The toner image transferred to the recording medium 30A is fixed by the fixing device 26.

On the other hand, the surface of the photoreceptor 12 after the toner image has been transferred is cleaned by the cleaning blade 22A in the cleaning device 22, and the charges are erased by the charge erasing device 24. In addition, a part of the particles of the fatty acid metal salt supplied to the surface of the photoreceptor 12 in the developing device 18 remains on the surface of the photoreceptor 12 even after the toner image is transferred by the transfer device 31, and is supplied to a position where the cleaning blade 22A and the photoreceptor 12 are in contact with each other.

Therefore, high cleaning performance is exhibited by the cleaning blade 22A due to the presence of the fatty acid metal salt at the position where the cleaning blade 22A and the photoreceptor 12 are in contact with each other.

Electrostatic Charge Image Developer

Next, in the image forming apparatus according to the present exemplary embodiment, an electrostatic charge image developer accommodated in the developing device (hereinafter, also referred to as "electrostatic charge image developer according to the present exemplary embodiment") will be described.

The electrostatic charge image developer according to the present exemplary embodiment is a two-component developer containing a toner and a carrier.

Toner

The toner includes toner particles and an external additive.

Toner Particles

The toner particles contain, for example, a binder resin (for example, a polyester resin), and may also contain a colorant, a release agent, other additives, and the like.

The toner particles may be toner particles having a single layer structure or toner particles having a so-called core/shell structure formed of a core portion (core particle) and a coating layer (shell layer) covering the core portion.

The volume average particle diameter (D50v) of the toner particles is, for example, preferably 2 μm or greater and 10 μm or less and more preferably 4 μm or greater and 8 μm or less.

Further, various average particle diameters and various particle size distribution indices of the toner particles are measured using Coulter Multisizer II (manufactured by Beckman Coulter Inc.) and ISOTON-II (manufactured by Beckman Coulter Inc.) as an electrolytic solution.

During the measurement, 0.5 mg or greater and 50 mg or less of a measurement sample is added to 2 ml of a 5% aqueous solution of a surfactant (for example, preferably sodium alkylbenzene sulfonate) as a dispersant. The solution is added to 100 ml or greater and 150 ml or less of the electrolytic solution.

The electrolytic solution in which the sample is suspended is subjected to a dispersion treatment for 1 minute with an ultrasonic disperser, and the particle size distribution of particles having a particle diameter in the range of 2 μm or greater and 60 μm or less is measured by a Coulter Multisizer II using an aperture with an aperture diameter of 100 μm. Further, the number of particles to be sampled is 50,000.

Cumulative distribution of the volume and the number is drawn from the small diameter side for each particle size range (channel) divided based on the particle size distribution to be measured, and the particle diameter at a cumulative 16% is defined as the volume particle diameter D16v and the number particle diameter D16p, the particle diameter at a cumulative 50% is defined as the volume average particle diameter D50v and the cumulative number average particle diameter D50p, and the particle diameter at a cumulative 84% is defined as the volume particle diameter D84v and the number particle diameter D84p.

Based on the description above, the volume particle size distribution index (GSDv) is calculated as $(D84v/D16v)^{1/2}$, and the number particle size distribution index (GSDp) is calculated as $(D84p/D16p)^{1/2}$.

The average circularity of the toner particles is, for example, preferably 0.94 or greater and 1.00 or less and more preferably 0.95 or greater and 0.98 or less.

The average circularity of the toner particles is acquired by (perimeter equivalent to circle)/(perimeter)[(perimeter of circle having same projected area as particle image)/(perimeter of projected particle image)]. Specifically, the average circularity is a value measured by the following method.

First, the average circularity is acquired by a flow type particle image analyzer (FPIA-3,000, manufactured by Sysmex Corporation) that sucks and collects toner particles to be measured, forms a flat flow, instantly emits strobe light so that a particle image is captured as a still image, and analyzes the particle image. Further, the number of samples in a case of calculating the average circularity is set to 3,500.

Further, in a case where the toner has an external additive, the toner (developer) to be measured is dispersed in water containing a surfactant, and an ultrasonic treatment is performed, thereby obtaining toner particles from which the external additive has been removed.

External Additive

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO·SiO_2$, $K_2O·(TiO_2)_n$, $Al_2O_3·2SiO_2$, $CaCO_3$, $MgCO_3$, $BaSO_4$, and $MgSO_4$.

The surface of the inorganic particle serving as the external additive may be subjected to, for example, a hydrophobic treatment. The hydrophobic treatment is performed, for example, by immersing the inorganic particles in a hydrophobic treatment agent. The hydrophobic treatment agent is not particularly limited, and examples thereof include a silane-based coupling agent, silicone oil, a titanate-based coupling agent, and an aluminum-based coupling agent. Such hydrophobic treatment agent may be used alone or in combination of two or more kinds thereof.

The amount of the hydrophobic treatment agent is, for example, typically 1 part by mass or greater and 10 parts by mass or less with respect to 100 parts by mass of the inorganic particles.

Examples of the external additives also include resin particles (resin particles such as polystyrene, polymethyl methacrylate (PMMA), and a melamine resin) and a cleaning activator (for example, fluorine-based polymer particles).

The amount of the external additive to be externally added is, for example, preferably 0.01% by mass or greater and 5% by mass or less and more preferably 0.01% by mass or greater and 2.0% by mass or less with respect to the entirety of the toner particles.

Carrier

Examples of the carrier include known carriers such as a coating carrier having a core material consisting of magnetic powder and a coating resin layer containing a coating resin and conductive particles on the surface of the core material.

Examples of the magnetic powder include magnetic metals such as iron, nickel, and cobalt and magnetic oxides such as ferrite and magnetite.

Examples of the coating resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin formed to have an organosiloxane bond, a modified product thereof, a fluororesin, polyester, polycarbonate, a phenol resin, and an epoxy resin.

Examples of the conductive particles include metals such as gold, silver, and copper, and particles such as carbon black, titanium oxide, zinc oxide, tin oxide, barium sulfate, aluminum borate, and potassium titanate.

Here, the surface of a core material is coated with a coating resin by a method of coating the surface with a solution for forming a coating layer, which is obtained by dissolving a coating resin, conductive particles, and various additives as necessary in an appropriate solvent. The solvent is not particularly limited, and may be selected in consideration of the coating resin to be used, coating suitability, and the like.

Specific examples of the resin coating method include a dipping method of dipping the core material in the solution for forming a coating layer, a spray method of spraying the solution for forming a coating layer to the surface of the core material, a fluidized bed method of spraying the solution for forming a coating layer to the core material that is floating by an air flow, and a kneader coater method of mixing the core material of the carrier with the solution for forming a coating layer in a kneader coater and removing the solvent.

A carrier having a volume resistance value of $1\times10^{9}\Omega$ or greater and $1\times10^{16}\Omega$ or less is employed as the carrier.

In a case where the volume resistance value of the carrier is $1\times10^{9}\Omega$ or less, the charge is injected from the carrier into the photoreceptor at the contact point between the carrier and the photoreceptor, the potential unevenness of the photoreceptor is degraded, and thus dot reproducibility is degraded. Meanwhile, in a case where the volume resistance value of the carrier is $1\times10^{16}\Omega$ or less, the charge is difficult to inject from the carrier to the photoreceptor at the contact point between the carrier and the photoreceptor, and the potential unevenness of the photoreceptor is reduced. Therefore, the dot reproducibility is improved. In a case where the volume resistance value of the carrier is greater than $1\times10^{16}\Omega$, the toner chargeability of the carrier is degraded, and thus the dot reproducibility is degraded.

The volume resistance value of the carrier is, for example, preferably $1\times10^{11}\Omega$ or greater and $1\times10^{14}\Omega$ or less.

The volume resistance value of the carrier can be adjusted, for example, by adjusting the content of the conductive particles of the coating type carrier.

A method of measuring the volume resistance value of the carrier is as follows.

The carrier is spread in a cylindrical insulator ring in which a disk electrode is disposed at the bottom. Further, the disk electrode is disposed on the carrier spread in the cylindrical insulator ring. In this manner, the carrier layer is sandwiched between a pair of disk electrodes.

A voltage V of 500 V is applied thereto in this state, and a resistance R (=V/I) is acquired from a current value I 10 seconds after the application of the voltage.

Next, a volume resistance value p of the carrier is measured based on a cell constant determined by the resistance R (Ω), a distance d (mm) between the pair of disk electrodes, and an area S ($mm^2$) of the pair of disk electrodes. Specifically, the volume resistance value of the carrier is measured according to the following equation.

$$\text{Volume resistance value } \rho \text{ of carrier} = V/I \times S/d$$

The volume average particle diameter of the carrier is, for example, preferably 20 μm or greater and 100 μm or less, more preferably 20 μm or greater and 70 μm or less, and still more preferably 30 μm or greater and 50 μm or less.

In a case where the volume average particle diameter of the carriers is 20 μm or greater, scattering of the toner to the outside of the dots is suppressed. In a case where the volume average particle diameter of the carriers is 100 μm or less, variation in dot diameters is difficult to occur. As a result, the dot reproducibility is difficult to degrade.

The volume average particle diameter of the carrier is a value measured by a laser diffraction particle size distribution measuring device LA-700 (manufactured by Horiba, Ltd.). Specifically, in a particle size range (channel) where particle size distribution obtained by a measuring device is divided, 50% cumulative particle diameter obtained by subtracting the volume cumulative distribution from the small particle diameter side is defined as the volume average particle diameter.

The mixing ratio (mass ratio) of the toner to the carrier (toner:carrier) in the developer is, for example, preferably in a range of 1:100 to 30:100 and more preferably in a range of 3:100 to 20:100.

The configuration of the image forming apparatus described in the present exemplary embodiment is an example, and it goes without saying that the configuration may be changed within a range not departing from the gist of the present exemplary embodiment.

EXAMPLES

Hereinafter, the present invention will be described in more detail with reference to examples and comparative examples, but the present invention is not limited to such examples.

Preparation of Electrophotographic Photoreceptor

Preparation of Silica Particles 30 parts by mass of a trimethylsilane compound (1,1,1,3,3,3-hexamethyldisilazane (manufactured by Tokyo Chemical Industry Co., Ltd.)) serving as a hydrophobic treatment agent is added to 100 parts by mass of untreated (hydrophilic) silica particles "trade name: OX50 (manufactured by Nippon Aerosil Co., Ltd.), volume average particle diameter: 40 nm", the mixture is allowed to react for 24 hours and filtered, thereby obtaining hydrophobized silica particles. The particles are defined as silica particles (1). The condensation ratio of the silica particles (1) is 93%.

Preparation of Electrophotographic Photoreceptor 1

Preparation of Undercoat Layer 100 parts by mass of zinc oxide (manufactured by Tayca Corporation, average particle diameter of 70 nm, specific surface area of 15 $m^2/g$) is stirred and mixed with 500 parts by mass of tetrahydrofuran, 1.3 parts by mass of a silane coupling agent (KBM503, manufactured by Shin-Etsu Chemical Co., Ltd.) is added thereto, and the mixture is stirred for 2 hours. Thereafter, tetrahydrofuran is distilled off by vacuum distillation and baked at 120° C. for 3 hours to obtain zinc oxide surface-treated with a silane coupling agent.

110 parts by mass of the surface-treated zinc oxide (zinc oxide surface-treated with a silane coupling agent) is stirred and mixed with 500 parts by mass of tetrahydrofuran, a solution obtained by dissolving 0.6 parts by mass of alizarin in 50 parts by mass of tetrahydrofuran is added thereto, and the mixture is stirred at 50° C. for 5 hours. Thereafter, zinc oxide to which alizarin is added is filtered off by vacuum filtration, and further dried under reduced pressure at 60° C. to obtain zinc oxide to which alizarin is added.

A mixed solution is obtained by mixing 60 parts by mass of the zinc oxide to which alizarin is added, 13.5 parts by mass of a curing agent (blocked isocyanate, SUMIDUR 3175, manufactured by Sumitomo Bayer Urethane Co., Ltd.), 15 parts by mass of a butyral resin (S-LEC BM-1, manufactured by Sekisui Chemical Co., Ltd.), and 85 parts by mass of methyl ethyl ketone. 38 parts by mass of this mixed solution and 25 parts by mass of methyl ethyl ketone are mixed and dispersed for 2 hours in a sand mill using glass beads having a diameter of 1 mmφ, thereby obtaining a dispersion liquid.

0.005 part by mass of dioctyltin dilaurate as a catalyst and 40 parts by mass of silicone resin particles (TOSPEARL 145, manufactured by Momentive Performance Materials Inc.) are added to the obtained dispersion liquid, thereby obtaining a coating solution for forming an undercoat layer. An aluminum substrate having a diameter of 60 mm, a length of 357 mm, and a thickness of 1 mm is coated with the coating solution by a dip coating method, and dried and cured at 170° C. for 40 minutes, thereby forming an undercoat layer having a thickness of 19 μm.

Preparation of Charge Generation Layer

A mixture of 15 parts by mass of hydroxygallium phthalocyanine having diffraction peaks at positions where Bragg angles (2θ+0.2°) in an X-ray diffraction spectrum using Cukα characteristic X-rays are at least 7.3°, 16.0°, 24.9°, and 28.0° as the charge generation material, 10 parts by mass of vinyl chloride-vinyl acetate copolymer (VMCH, manufactured by Nippon Unicar Company Limited) as a binder resin, and 200 parts by mass of n-butyl acetate is dispersed in a sand mill for 4 hours using glass beads having a diameter of 1 mmφ. 175 parts by mass of n-butyl acetate and 180 parts by mass of methyl ethyl ketone are added to the obtained dispersion liquid, and the mixture is stirred, thereby obtaining a coating solution for forming a charge generation layer. The undercoat layer is immersed in and coated with the coating solution for forming a charge generation layer and dried at room temperature (25° C.), thereby forming a charge generation layer having a film thickness of 0.2 μm.

Preparation of Charge Transport Layer 250 parts by mass of tetrahydrofuran is added to 50 parts by mass of the silica particles (1), 25 parts by mass of 4-(2,2-diphenylethyl)-4',4"-dimethyl-triphenylamine as a charge transport material and 25 parts by mass of the bisphenol Z type polycarbonate resin (viscosity average molecular weight: 30,000) as a binder resin are added thereto while the liquid temperature is maintained at 20° C., and the mixture is stirred and mixed for 12 hours, thereby obtaining a coating solution for forming a charge transport layer.

The charge generation layer is coated with the coating solution for forming a charge transport layer and dried at 135° C. for 40 minutes to form a charge transport layer having a film thickness of 20 μm, thereby obtaining an organic photoreceptor (1).

The organic photoreceptor (1) in which the undercoat layer, the charge generation layer, and the charge transport layer are laminated and formed in this order on an aluminum substrate is obtained by performing the above-described step.

Formation of Inorganic Protective Layer

Next, an inorganic protective layer formed of gallium oxide containing hydrogen is formed on the surface of the organic photoreceptor (1). The inorganic protective layer is formed by using a film forming device having the configuration shown in FIGS. 2A and 2B.

First, the organic photoreceptor (1) is placed on the substrate support member 213 in the film forming chamber 210 of the film forming device, and vacuum exhaust is carried out in the film forming chamber 210 via the exhaust port 211 until the pressure reaches 0.1 Pa.

Next, He-diluted 40% oxygen gas (flow rate of 1.6 sccm) and hydrogen gas (flow rate of 50 sccm) are introduced from a gas introduction pipe 220 into a high-frequency discharge pipe portion 221 provided with the flat plate electrode 219 having a diameter of 85 mm, and a radio wave at a frequency of 13.56 MHz is set at an output of 150 W by the high-frequency power supply unit 218 and a matching circuit (not shown in FIGS. 2A and 2B), matched with a tuner, and discharged from the flat plate electrode 219. A reflected wave at this time is 0 W.

Next, trimethyl gallium gas (flow rate of 1.9 sccm) is introduced from the shower nozzle 216 to the plasma diffusion unit 217 in the film forming chamber 210 via the gas introduction pipe 215. Here, the reaction pressure in the film forming chamber 210 measured by a Baratron vacuum gauge is 5.3 Pa.

Film formation is carried out for 68 minutes while the organic photoreceptor (1) rotates at a speed of 500 rpm in this state, and an inorganic protective layer having a film thickness of 1.5 μm is formed on the surface of the charge transport layer of the organic photoreceptor (1).

The surface roughness Ra on the outer peripheral surface of the inorganic protective layer is 1.9 nm.

The element composition ratio (oxygen/gallium) of oxygen to gallium in the inorganic protective layer is 1.25.

An electrophotographic photoreceptor 1 in which the undercoat layer, the charge generation layer, the charge transport layer, and the inorganic protective layer are formed in this order on the conductive substrate is obtained by performing the above-described step.

Example 1

An image forming apparatus "Versant 180 Press (manufactured by FUJIFILM Business Innovation Corp.)" is prepared.

As the carrier of a two-component developer accommodated in the developing device of the image forming apparatus, a resin-coated carrier having the volume resistance value and the volume average particle diameter listed in Table 1 is employed by adjusting the amount of carbon black contained in the coating resin layer.

Further, the electrophotographic photoreceptor 1 is mounted on the image forming apparatus, and the present apparatus is used as the image forming apparatus of Example 1.

Examples 2 to 25 and Comparative Examples 1 and 2

Image forming apparatuses having the same configuration as the configuration of the device in Example 1 are used as image forming apparatuses in Examples 2 to 25 and Comparative Examples 1 and 2 except that the volume resistance value and the volume average particle diameter of the carrier, the element composition ratio (oxygen/gallium) of the electrophotographic photoreceptor, the film thickness of the charge transport layer, and the film thickness of the inorganic protective layer are changed as listed in Table 1.

Further, the volume resistance value of the carrier is adjusted by adjusting the amount of carbon black contained in the coating resin layer.

The element composition ratio (oxygen/gallium) of the electrophotographic photoreceptor is adjusted by adjusting the flow rate of He-diluted 40% oxygen gas, hydrogen gas, and trimethyl gallium gas.

Evaluation

The following evaluation is performed using the image forming apparatus of each example.

Dot Reproducibility

Dot reproducibility is evaluated as follows.

A halftone image with a density of 50% is printed and observed with a microscope, and determination is performed according to the following standards.

The evaluation standard is as follows.

A: The outline of the dot edge is clear, the shape of the dot is observed in a round shape, and the image quality is in a perfect level.

B: The outline of the dot edge is less blurred, the shape of the dot is observed to be almost round, and the image quality is in a sufficiently acceptable level.

C: The outline of the dot edge is slightly blurred, the shape of the dot is slightly distorted, and the image quality is in a barely acceptable level.

D: The outline of the dot edge is severely blurred, the shape of the dot is distorted, and the image quality is defective.

TABLE 1

| | Carrier | | Photoreceptor | | | |
|---|---|---|---|---|---|---|
| | | | Inorganic protective layer | | Charge transport | |
| | Volume resistance value Ω | Volume average particle diameter μm | Element composition ratio (oxygen/gallium) — | Film thickness μm | layer Film thickness μm | Evaluation Dot reproducibility |
| Example 1 | $1 \times 10^{13}$ Ω | 40 μm | 1.25 | 1.5 | 20 | A |
| Example 2 | $1 \times 10^{9}$ Ω | 40 μm | 1.25 | 1.5 | 20 | C |
| Example 3 | $1 \times 10^{11}$ Ω | 40 μm | 1.25 | 1.5 | 20 | B |
| Example 4 | $1 \times 10^{14}$ Ω | 40 μm | 1.25 | 1.5 | 20 | B |
| Example 5 | $1 \times 10^{16}$ Ω | 40 μm | 1.25 | 1.5 | 20 | C |
| Example 6 | $1 \times 10^{13}$ Ω | 15 μm | 1.25 | 1.5 | 20 | C |
| Example 7 | $1 \times 10^{13}$ Ω | 20 μm | 1.25 | 1.5 | 20 | B |
| Example 8 | $1 \times 10^{13}$ Ω | 30 μm | 1.25 | 1.5 | 20 | A |
| Example 9 | $1 \times 10^{13}$ Ω | 50 μm | 1.25 | 1.5 | 20 | A |
| Example 10 | $1 \times 10^{13}$ Ω | 100 μm | 1.25 | 1.5 | 20 | B |
| Example 11 | $1 \times 10^{13}$ Ω | 110 μm | 1.25 | 1.5 | 20 | C |
| Example 12 | $1 \times 10^{13}$ Ω | 40 μm | 1.1 | 1.5 | 20 | C |
| Example 13 | $1 \times 10^{13}$ Ω | 40 μm | 1.2 | 1.5 | 20 | B |
| Example 14 | $1 \times 10^{13}$ Ω | 40 μm | 1.22 | 1.5 | 20 | A |
| Example 15 | $1 \times 10^{13}$ Ω | 40 μm | 1.3 | 1.5 | 20 | A |
| Example 16 | $1 \times 10^{13}$ Ω | 40 μm | 1.6 | 1.5 | 20 | B |
| Example 17 | $1 \times 10^{13}$ Ω | 40 μm | 1.7 | 1.5 | 20 | C |
| Example 18 | $1 \times 10^{13}$ Ω | 40 μm | 1.25 | 0.1 | 20 | B |
| Example 19 | $1 \times 10^{13}$ Ω | 40 μm | 1.25 | 0.5 | 20 | A |
| Example 20 | $1 \times 10^{13}$ Ω | 40 μm | 1.25 | 10 | 20 | B |
| Example 21 | $1 \times 10^{13}$ Ω | 40 μm | 1.25 | 11 | 20 | C |
| Example Ω | $1 \times 10^{13}$ Ω | 40 μm | 1.25 | 1.5 | 8 | C |
| Example 23 | $1 \times 10^{13}$ Ω | 40 μm | 1.25 | 1.5 | 10 | B |
| Example 24 | $1 \times 10^{13}$ Ω | 40 μm | 1.25 | 1.5 | 30 | B |
| Example 25 | $1 \times 10^{13}$ Ω | 40 μm | 1.25 | 1.5 | 35 | C |
| Comparative Example 1 | $1 \times 10^{8}$ Ω | 40 μm | 1.25 | 1.5 | 20 | D |
| Comparative Example 2 | $1 \times 10^{17}$ Ω | 40 μm | 1.25 | 1.5 | 20 | D |

As shown in the above-described results, it may be seen that the image forming apparatus of the examples has satisfactory dot reproducibility and suppresses degradation of dot reproducibility as compared with the image forming apparatus of the comparative examples.

The present exemplary embodiment includes the following aspects.

(((1)))

An image forming apparatus comprising:

an electrophotographic photoreceptor that includes a conductive substrate, a photosensitive layer, and an inorganic surface layer containing a group 13 element and oxygen in this order;

a charging device that charges a surface of the electrophotographic photoreceptor;

an electrostatic charge image forming device that forms an electrostatic charge image on the charged surface of the electrophotographic photoreceptor;

a developing device that accommodates an electrostatic charge image developer containing a toner and a carrier with a volume resistance value of $1\times10^{9}\Omega$ or greater and $1\times10^{16}\Omega$ or less, supplies the electrostatic charge image developer, and develops the electrostatic charge image formed on the surface of the electrophotographic photoreceptor as a toner image; and a transfer device that transfers the toner image formed on the surface of the electrophotographic photoreceptor to a surface of a recording medium.

(((2)))

The image forming apparatus according to (((1))) wherein the carrier has a volume resistance value of $1\times10^{11}\Omega$ or greater and $1\times10^{14}\Omega$ or less.

(((3)))

The image forming apparatus according to (((1))) or (((2))), wherein the carrier has a volume average particle diameter of 20 μm or greater and 100 μm or less.

(((4)))

The image forming apparatus according to (((3))), wherein the carrier has a volume average particle diameter of 30 μm or greater and 50 μm or less.

(((5)))

The image forming apparatus according to any one of (((1))) to (((4))), wherein an element composition ratio (oxygen/group 13 element) of the oxygen to the group 13 element in the inorganic surface layer is 1.2 or greater and 1.6 or less.

(((6)))

The image forming apparatus according to (((5))), wherein the element composition ratio (oxygen/group 13 element) of the oxygen to the group 13 element in the inorganic surface layer is 1.22 or greater and 1.3 or less.

(((7)))

The image forming apparatus according to any one of (((1))) to (((6))), wherein the inorganic surface layer has a film thickness of 0.5 μm or greater and 10 μm or less.

(((8)))

The image forming apparatus according to any one of (((1))) to (((7))), wherein the photosensitive layer includes a charge transport layer having a film thickness of 10 μm or greater and 30 μm or less.

(((9)))

A unit for an image forming apparatus, comprising:

an electrophotographic photoreceptor that includes a conductive substrate, a photosensitive layer, and an inorganic surface layer containing a group 13 element and oxygen in this order; and a developing device that accommodates an electrostatic charge image developer containing a toner and a carrier with a volume resistance value of $1\times10^{9}\Omega$ or greater and $1\times10^{16}\Omega$ or less, supplies the electrostatic charge image developer, and develops an electrostatic charge image formed on a surface of the electrophotographic photoreceptor as a toner image.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an electrophotographic photoreceptor comprising: a conductive substrate; a photosensitive layer; and an inorganic surface layer containing a group 13 element and oxygen in this order;

a charging device configured to charge a surface of the electrophotographic photoreceptor;

an electrostatic charge image forming device configured to form an electrostatic charge image on the charged surface of the electrophotographic photoreceptor;

a developing device that accommodates an electrostatic charge image developer containing a toner and a carrier with a volume resistance value of $1\times10^{9}\Omega$ or greater and $1\times10^{16}\Omega$ or less, wherein the developing device is configured to supply the electrostatic charge image developer, and to develop the electrostatic charge image formed on the surface of the electrophotographic photoreceptor as a toner image; and a transfer device configured to transfer the toner image formed on the surface of the electrophotographic photoreceptor to a surface of a recording medium.

2. The image forming apparatus according to claim 1, wherein the carrier has a volume resistance value of $1\times10^{11}\Omega$ or greater and $1\times10^{14}\Omega$ or less.

3. The image forming apparatus according to claim 1, wherein the carrier has a volume average particle diameter of 20 μm or greater and 100 μm or less.

4. The image forming apparatus according to claim 3, wherein the carrier has a volume average particle diameter of 30 μm or greater and 50 μm or less.

5. The image forming apparatus according to claim 1, wherein an element composition ratio (oxygen/group 13 element) of the oxygen to the group 13 element in the inorganic surface layer is 1.2 or greater and 1.6 or less.

6. The image forming apparatus according to claim 5, wherein the element composition ratio (oxygen/group 13 element) of the oxygen to the group 13 element in the inorganic surface layer is 1.22 or greater and 1.3 or less.

7. The image forming apparatus according to claim 1, wherein the inorganic surface layer has a film thickness of 0.5 μm or greater and 10 μm or less.

8. The image forming apparatus according to claim 1, wherein the photosensitive layer includes a charge transport layer having a film thickness of 10 μm or greater and 30 μm or less.

9. A unit for an image forming apparatus, comprising:

an electrophotographic photoreceptor comprising: a conductive substrate; a photosensitive layer; and an inorganic surface layer containing a group 13 element and oxygen in this order; and a developing device that accommodates an electrostatic charge image developer containing a toner and a carrier with a volume resistance value of $1\times10^{9}\Omega$ or greater and $1\times10^{16}\Omega$ or less, wherein the developing device is configured to supply the electrostatic charge image developer, and to develop an electrostatic charge image formed on a surface of the electrophotographic photoreceptor as a toner image.

* * * * *